(12) United States Patent
Leister et al.

(10) Patent No.: US 11,340,457 B2
(45) Date of Patent: May 24, 2022

(54) DISPLAY DEVICE FOR ENLARGING THE FIELD OF VIEW

(71) Applicant: SEEREAL TECHNOLOGIES S.A., Munsbach (LU)

(72) Inventors: Norbert Leister, Dresden (DE); Bo Kroll, London (GB); Gerald Futterer, Metten (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 192 days.

(21) Appl. No.: 16/630,648

(22) PCT Filed: Jul. 12, 2018

(86) PCT No.: PCT/EP2018/068901
§ 371 (c)(1),
(2) Date: Jan. 13, 2020

(87) PCT Pub. No.: WO2019/012028
PCT Pub. Date: Jan. 17, 2019

(65) Prior Publication Data
US 2020/0166754 A1 May 28, 2020

(30) Foreign Application Priority Data

Jul. 13, 2017 (EP) .................................. 17181136
Oct. 18, 2017 (EP) .................................. 17197171

(51) Int. Cl.
*G02B 27/01* (2006.01)
*G02B 5/18* (2006.01)
(Continued)

(52) U.S. Cl.
CPC ....... *G02B 27/0172* (2013.01); *G02B 5/1828* (2013.01); *G02B 6/0045* (2013.01);
(Continued)

(58) Field of Classification Search
CPC ............ G02B 6/0045; G02B 2027/015; G02B 2027/0174; G02B 27/0172; G02B 27/017;
(Continued)

(56) References Cited

U.S. PATENT DOCUMENTS 9,513,480 B2 * 12/2016 Saarikko .............. G02B 5/1861
9,827,209 B2 * 11/2017 Kostamo ............ G01N 33/6896
(Continued)

FOREIGN PATENT DOCUMENTS

WO  2010149588 A1  12/2010
WO  2016156287 A1  10/2016
WO  2018146326 A2   8/2018

OTHER PUBLICATIONS

International Search Report, dated Nov. 21, 2018, issued in International Application No. PCT/EP2018/068901.

*Primary Examiner* — William R Alexander
(74) *Attorney, Agent, or Firm* — Saul Ewing Arnstein & Lehr LLP

(57) ABSTRACT

A display device for representing two-dimensional and/or three-dimensional objects or scenes, having at least one spatial light modulation device having pixels for modulating light, at least one optical system, and at least one light guiding device. Light beams originating from the individual pixels of the spatial light modulation device are incident on the at least one light guiding device at different angles on average in relation to the surface of the at least one light guiding device and can be coupled therein, whereby a coupling angular spectrum is definable. The light beams propagating in the at least one light guiding device can be coupled out of the at least one light guiding device at different angles on average in relation to an observer region, whereby a decoupling angular spectrum is definable. The
(Continued)

decoupling angular spectrum is enlarged in comparison to the coupling angular spectrum.

49 Claims, 12 Drawing Sheets

(51) Int. Cl.
  *F21V 8/00* (2006.01)
  *G02B 27/00* (2006.01)
(52) U.S. Cl.
  CPC ..... *G02B 27/0081* (2013.01); *G02B 27/0176* (2013.01); *G02B 2027/015* (2013.01); *G02B 2027/0123* (2013.01); *G02B 2027/0174* (2013.01)
(58) Field of Classification Search
  CPC ............................ G02B 27/01; G02B 27/0176; G02B 27/0081; G02B 5/1828; G02B 5/18
  USPC .......................................................... 359/572
  See application file for complete search history.

(56) References Cited

U.S. PATENT DOCUMENTS

| | | |
|---|---|---|
| 10,018,844 B2 * | 7/2018 | Levola ..................... G02B 6/00 |
| 10,234,821 B2 | 3/2019 | Futterer et al. |
| 10,241,332 B2 * | 3/2019 | Vallius ................. G02B 5/1866 |
| 10,317,677 B2 * | 6/2019 | Levola ............... G02B 27/0081 |
| 10,429,645 B2 * | 10/2019 | Vallius ..................... G02B 6/00 |
| 10,670,862 B2 * | 6/2020 | Vallius ............... G02B 27/0081 |
| 2013/0222384 A1 | 8/2013 | Futterer |
| 2016/0231478 A1 * | 8/2016 | Kostamo ............ A61K 51/0491 |
| 2016/0231566 A1 | 8/2016 | Levola et al. |
| 2016/0231568 A1 * | 8/2016 | Saarikko ............ G02B 27/0172 |
| 2016/0231569 A1 * | 8/2016 | Levola .................... G02F 1/125 |
| 2016/0231570 A1 * | 8/2016 | Levola ................. G02B 6/0035 |
| 2017/0003505 A1 * | 1/2017 | Vallius ............... G02B 27/4205 |
| 2017/0102543 A1 * | 4/2017 | Vallius ................. G06T 19/006 |
| 2017/0102544 A1 * | 4/2017 | Vallius ................... G02B 6/124 |
| 2018/0364643 A1 | 12/2018 | Kroll et al. |

* cited by examiner

DISPLAY DEVICE FOR ENLARGING THE FIELD OF VIEW

CROSS REFERENCE TO RELATED APPLICATIONS

This application claims the priority of PCT/EP2018/068901, filed on Jul. 12, 2018, which claims priority to European Application No. EP 17181136.7, filed on Jul. 13, 2017, and European Application No. EP 17197171.6, filed on Oct. 18, 2017, the entire contents of each of which are incorporated fully herein by reference.

BACKGROUND OF THE INVENTION

The invention relates to a display device for representing two-dimensional and/or three-dimensional objects or scenes. Furthermore, the invention also relates to a method for generating a large field of view by means of such a display device.

Light guiding devices having a light guide have wide applications in particular in the optical field. In particular, they are used in the field of lasers. Light guides generally have a core in the interior, which is enclosed by a cladding or a cladding layer. The light entering the light guide is usually propagated therein via total reflection. This light guiding effect because of the total reflection arises due to the higher index of refraction of the core material than the index of refraction of the cladding material or, if no cladding layer is provided, due to the higher index of refraction of the light guide material than the index of refraction of the surroundings, for example, air.

Light guiding devices can also be used in other fields, however, for example in devices for representing reconstructed scenes, in particular in devices for representing reconstructed, preferably three-dimensional, scenes or object points. Such devices can be, for example, displays or display devices located close to the eye of an observer of a scene, so-called near-to-eye displays. One near-to-eye display is, for example, a head-mounted display (HMD).

For a head-mounted display (HMD) or a similar display or display device located close to the eye, it is desirable to use a compact and light optical construction. Since such a display device is generally fastened to the head of a user, a voluminous and heavy arrangement would impair the user comfort disadvantageously.

The visibility range or field of view is also important for the user comfort in an HMD. The largest possible field of view is advantageous in this case. In general, however, the representation of a large field of view in combination with a high resolution requires a spatial light modulation device having a very high number of pixels.

A holographic head-mounted display (HMD) having a virtual observer window is disclosed in US 2013/0222384 A1. Such a head-mounted display can achieve a large field of view by segmenting the field of view. In this case, various parts of the field of view, which are visible from an observer window, are generated time-sequentially using a spatial light modulator and a suitable optical system. One advantage of this device is that due to the sequential representation, a large field of view is achieved without a high number of pixels of the spatial light modulator being required.

Various embodiments are described in US 2013/0222384 A1 to achieve an enlargement of the field of view by means of such a multiple image of the spatial light modulator composed of segments or by means of tiling.

Embodiments having waveguides are also described in US 2013/0222384 A1. One embodiment has respectively one waveguide for the left observer eye and one waveguide for the right observer eye. In this arrangement, a spatial light modulator and an optical unit are each provided laterally adjacent to the head of an observer, where light is coupled into the waveguide by means of a grating respectively for each eye. Light is coupled into the waveguides at a flat angle by means of the coupling gratings, so that the light of all coupling angles propagates via total reflection at the two boundary surfaces of the waveguide, which are arranged parallel to one another, in the direction of the waveguide. A light deflection device generates time-sequentially various angle spectra, which are coupled into the waveguide. To generate a segmented multiple image, a different angular spectrum is coupled into the waveguide for each segment of the multiple image. The light of one of the angular spectra generated by the light deflection device is coupled out of the waveguide, in each case at a different position, in the direction of the observer eye via multiple decoupling gratings, which are each designed for a different angular range with respect to the angle selectivity thereof and are arranged adjacent to one another.

One advantage of this embodiment in relation to other embodiments described in US 2013/0222384 A1 is that the waveguide is light and compact.

The book by Keigo Iizuka, Elements of Photonics, Volume II chapter 9 "Planar Optical Guides for Integrated Optics" is also to be cited here with respect to the light propagation in optical guides: "The foundation of integrated optics is the planar optical guide. The light is guided by a medium whose index of refraction is higher than that of surrounding layers . . . . According to geometrical optics, light will propagate by successive total internal reflections with very little loss provided that certain conditions are met. These conditions are that the layer supporting the propagation must have a higher refractive index than the surrounding media, and the light must be launched within an angle that satisfies total internal reflection at the upper and lower boundaries. This simple geometrical optics theory fails when the dimensions of the guiding medium are comparable to the wavelength of the light. In this regime, the guide supports propagation only for a discrete number of angles, called modes of propagation." In the latter case, the light propagation is described by a wave-optical approach. The term "waveguide" is then typically used. A defined geometrical beam profile is not present in such a waveguide.

In contrast thereto, in the present application the term "light guide" is used in such a way that it refers to a sufficiently thick arrangement, for which the light propagation can be described by geometrical optics. Such a light guide can have, for example, a thickness of a few millimeters, for example 2 mm or 3 mm.

A holographic display device or display is based, inter alia, on the effect of diffraction at the apertures of the pixels of the spatial light modulation device and the interference of coherent light, which is emitted by a light source. Nonetheless, several important conditions may be formulated and defined for a holographic display device, which generates a virtual observer window, using geometrical optics.

On the one hand, the illumination beam path in the display device is significant for this purpose. It is used, inter alia, for generating a virtual observer window. A spatial light modulation device is illuminated by means of an illumination device, which comprises at least one real or virtual light source. The light coming from the different pixels of the spatial light modulation device then has to be directed in each case into the virtual observer window. For this purpose, the at least one light source of the illumination device, which illuminates the spatial light modulation device, is usually imaged in an observer plane having the virtual observer window. This imaging of the light source takes place, for example, in the center of the virtual observer window. Upon illumination of a spatial light modulation device using a planar wave, which corresponds to a light source in infinity, for example, light from different pixels of the spatial light modulation device, which exits perpendicularly from these pixels, is focused in the center of the virtual observer window. Light which does not originate perpendicularly but in each case at the same angle of diffraction from various pixels of the spatial light modulation device is then also focused at a respective identical position in the virtual observer window. In general, however, the virtual observer window can also be laterally displaced in relation to the image of the at least one light source, for example, the position of the image of the at least one light source can coincide with the left or right edge of the observer window.

On the other hand, the imaging beam path is significant in the holographic display or display device, except in a direct view display. In an HMD, in general an enlarged image of a spatial light modulation device which is small in its dimensions is generated. This is frequently a virtual image which appears to be at a greater distance to the observer than the distance at which the spatial light modulation device itself is located. The individual pixels of the spatial light modulation device are usually imaged enlarged.

A holographic direct view display which generates a virtual observer window comprises an illumination beam path. The display comprises an illumination device having at least one light source. For example, the illumination device is designed as a backlight, which generates a collimated, planar wavefront, which illuminates the spatial light modulation device. The collimated wavefront corresponds to a virtual light source which illuminates the spatial light modulation device from infinite distance. The spatial light modulation device can also be illuminated using a divergent or a convergent wavefront, however, which corresponds to a real or virtual light source at a finite distance in front of or behind the spatial light modulation device. A field lens focuses the light coming from the spatial light modulation device on the position of a virtual observer window. If a hologram is not encoded in the spatial light modulation device, an image of the light source thus results in the observer plane and the periodic repetitions of this image result as higher diffraction orders. If a suitable hologram is encoded in the spatial light modulation device, a virtual observer window results close to the zeroth diffraction order. This is referred to hereafter by stating that the virtual observer window is located in a plane of the light source image. In a holographic direct view display, the field lens which generates an image of the light source is usually located close to the spatial light modulation device. An observer sees the spatial light modulation device at its actual distance, without an image of the spatial light modulation device being present. There is then no imaging beam path.

In other holographic display devices, for example head-mounted displays (HMD), head-up displays (HUD), or other projection displays, there can additionally be an imaging beam path, as already briefly mentioned. A real or virtual image of the spatial light modulation device is generated in these display devices, which the observer sees, where the illumination beam path is still significant for the generation of a virtual observer window. Therefore, both beam paths, illumination beam path and imaging beam path, are important here.

The case that an imaging beam path and an illumination beam path are present can also occur in other display devices, for example, stereoscopic display devices. A stereoscopic display device for generating a sweet spot can comprise, for example, a similar optical arrangement as that of the mentioned holographic display devices, i.e., a collimated illumination of a spatial light modulation device and a field lens, but also additional components, for example a scattering element having a defined scattering angle. If the scattering element were removed from the display device, the field lens would thus generate a light source image in the plane of the sweet spot. By using the scattering element, the light is instead distributed over an expanded sweet spot, which is narrower than the inter-pupillary distance of an observer. The illumination beam path is important, however, to be able to see the stereoscopic image completely without vignetting effects. A three-dimensional stereo display device can also have an imaging beam path in this case, using which a spatial light modulation device is imaged at a specific distance from the observer.

In holographic display devices, the typical size of subholograms in the computation of a hologram from a three-dimensional scene is dependent on the location of the three-dimensional scene in space in relation to the plane or image plane of the spatial light modulation device. Subholograms having large dimensions arise, for example, if a scene is located far in front of the plane or image plane of the spatial light modulation device toward the observer. However, large subholograms increase the computational effort during the hologram computation. A method is disclosed in WO 2016/156287 A1 of the applicant, which reduces the computational effort by arithmetic introduction of a virtual plane of the spatial light modulation device. However, the option of selecting an optical system in such a way that the image plane of the spatial light modulation device results at a favorable position would alternatively also be desirable, so that the hologram can be computed having subholograms which have small dimensions.

Due to restrictions in the optical system and/or in the imaging system, it is not possible in all cases to generate an image of the spatial light modulation device at a point favorable for the subhologram computation. For example, the requirement of generating a large field of view in a head-mounted display could have the result that a lens having short focal length has to be used close in front of the eye of an observer. On the other hand, this can make it more difficult to generate an image plane of the spatial light modulation device in a location advantageous for the hologram computation if it is not possible to place the spatial light modulation device close enough to the lens.

In an alternative design of a holographic display device, which generates a virtual observer window, imaging of a spatial light modulation device can also take place in the virtual observer window. A type of screen or also a reference plane, if a physical screen is not present, for a holographic representation of a three-dimensional scene is provided in a Fourier plane of the spatial light modulation device, thus the image plane of a light source. Therefore, in such a display device, imaging beam path and illumination beam path are also present. However, the significance thereof for the hologram plane and the observer plane is exchanged. The virtual observer window is then located in an image plane of the spatial light modulation device, therefore has reference to the imaging beam path. The hologram or the reference plane for the computation of the hologram from the three-dimensional scene is located in a Fourier plane of the spatial light modulation device, and therefore has reference to the illumination beam path.

According to WO 2016/156287 A1, a virtual plane can be placed in the Fourier plane of the spatial light modulation device for the computation of holograms for such a display device. Subholograms are computed and summed in this virtual plane. The hologram which can be encoded into the spatial light modulation device is then determined by a Fourier transform from the summation hologram.

Such a display device having an image of the spatial light modulation device in an observer plane can also be used in a modified version for the purpose of generating a design of a stereoscopic three-dimensional display device having two flat views for left eye and right eye. If a suitably computed hologram is encoded into the spatial light modulation device and if the display device comprises an illumination device which generates sufficiently coherent light, a two-dimensional image is thus generated in a Fourier plane of the spatial light modulation device as the Fourier transform of the hologram. An additional scattering element can be located in this plane. If an image of the spatial light modulation device were generated in the observer plane without the scattering element, a sweet spot would thus result instead using the scattering element. The size of the sweet spot is dependent on the scattering angle of the scattering element. Such an arrangement can be used, for example, in a head-up display (HUD).

The following descriptions are primarily to relate to the case in which the virtual observer window or a sweet spot is present in the plane of the light source image. The statements made are also applicable accordingly to embodiments having an image of the spatial light modulation device in the virtual observer window by respective exchange of imaging beam path and illumination beam path or plane of the spatial light modulation device and Fourier plane. The present invention is therefore not to be restricted to the case having virtual observer window or sweet spot in the plane of the light source image.

The generation of a plurality of holographic segments of a multiple image of a light modulation device to generate a large field of view can require a high computational effort and time expenditure under certain circumstances.

SUMMARY OF THE INVENTION

It is therefore the object of the present invention to provide a display device, in particular a near-to-eye display device, which enables a large visibility range or field of view to be generated using simple means and without a high computational effort and time expenditure. This is preferably to be implementable in combination with a segmented image of a spatial light modulation device. A further object of the present invention is to provide a display device which has a compact and light setup and using which a virtual observer window can be generated in each case for all segments of an image of the spatial light modulation device at an identical position.

The present object is achieved according to the invention by a display device having the features of the claims.

According to the invention, a display device is provided, which is particularly suitable for use in near-to-eye displays and in particular in head-mounted displays here, but the use is not to be restricted to these displays or display devices. The display device could also be used, for example, in head-up displays.

Such a display device according to the invention for representing two-dimensional and/or three-dimensional objects or scenes comprises at least one spatial light modulation device having pixels, at least one optical system, and at least one light guiding device. The at least one spatial light modulation device is used for modulating incident light. The optical system is designed in such a way that light beams emitted from the individual pixels of the spatial light modulation device are incident on the light guiding device and can be coupled in at different angles on average viewed in relation to the surface of the light guiding device. A coupling angular spectrum of the light is thus definable. The light propagating in the light guiding device, which originates from the individual pixels of the spatial light modulation device, can be coupled out of the light guiding device at different angles on average in relation to an observer region, which can be formed, for example, as a virtual observer window or a sweet spot, whereby a decoupling angular spectrum is definable. The decoupling angular spectrum is enlarged in comparison to the coupling angular spectrum in this case.

By means of the light guiding device, which advantageously comprises a light guide, at least one light coupling device, and at least one light decoupling device, the light or light beams emitted from different pixels of the at least one spatial light modulation device is coupled at different angles on average into the light guiding device. Because of the different angles of the individual light beams of the light in relation to one another, which originate from the individual pixels of the at least one spatial light modulation device and are incident at different angles on the light guiding device, a coupling angular spectrum or a coupling angular range of the light is defined. The light, which is emitted from the individual different pixels and propagates in the light guide of the light guiding device at different angles, is also coupled out of the light guiding device at different angles on average in relation to an observer region. A decoupling angular spectrum or a decoupling angular range of the light is generated and defined in this manner. This decoupling angular spectrum is enlarged in this case in relation to the coupling angular spectrum.

In the case of a light guide which is embodied planar in the light guiding device, the light which is emitted from the individual different pixels of the spatial light modulation device is also coupled out of the light guiding device at different angles in relation to the surface of the light guiding device or also observed in relation to an observer region. In the case of a curved light guide of the light guiding device, for example, the case can occur that the light is coupled out in each case perpendicularly to the surface of the light guiding device, but then propagates at different angles in relation to an observer region.

The designation "on average" with respect to the different angles is to relate to the angle of an average light beam of light beams which originate from each pixel of the at least one spatial light modulation device. These individual angles of the average light beams of all pixels are to be different for each pixel when they are incident on the light coupling device of the light guiding device. This angle at which the average light beams of all pixels are incident on the light coupling device of the light guiding device can be set, for example, by an optical system between the spatial light modulation device and the light guiding device, but also optionally by an optical system in the light path before the spatial light modulation device. However, there are embodiments of the invention in which the individual light beams which originate from a single pixel do not have an unambiguous parallelism to one another, i.e., not all light beams are parallel to one another. Therefore, light beams could also be present from a single pixel, the angles of which could correspond to angles of other light beams from another pixel. For example, an angular spectrum of the light beams originating from the pixels can result because of diffraction at the pixel apertures for each pixel. Or, for example, the spatial light modulation device can already be illuminated using an angular spectrum due to the use of a scattering element. In these cases, however, an average angle is unambiguously determinable from this angular spectrum. However, viewed on average, the light beams of all pixels of the at least one spatial light modulation device are coupled into the light guiding device at different angles in relation to the surface of the light guiding device or the light coupling device and also coupled out of the light guiding device at different angles in relation to an observer region.

By means of the display device according to the invention, in this manner a large field of view is generated, within which a two-dimensional or three-dimensional object or also a scene can be represented. Two-dimensional objects can also be combined with three-dimensional objects in this case. The combination of represented two-dimensional and three-dimensional objects is advantageous in that the computational effort and time expenditure may be substantially reduced in relation to the representation of a three-dimensional scene which is reconstructed solely holographically, for example, since only the three-dimensional objects require a higher computational effort and time expenditure and the two-dimensional objects may be represented without great effort. The background and the enormous advantage of such a combined representation are as follows: a person or a human can only acquire a limited spatial angle with a high-resolution and a strongly perceptible three-dimensional impression within his natural environment or surroundings. If a very large spatial angle is available to this person, the features "high-resolution and strongly perceptible three-dimensional impression" are thus only present in a subregion of this overall spatial angle. This is the region on which the person can particularly concentrate and/or on which this person places his focus. Since this region can travel in space with the eye movement of the person, it is advantageous to also let the spatial region represented with the strong focus features and three-dimensional features travel. To be able to let this spatial region travel, the eye positions and/or the viewing direction of the person are expediently to be acquired.

For a light guide in a display device according to the prior art, in general a defined angular spectrum of the light is coupled into the light guide. This light having the defined angular spectrum then propagates in the light guide and is coupled out of the light guide again in a decoupling region. In this case, however, the angular spectrum of the light and thus the field of view is not changed by the light guide itself. The decoupled angular spectrum of the light and therefore the field of view visible to an observer observing an object or scene therefore corresponds to the coupled-in angular spectrum.

The field of view as a whole can also be enlarged by sequential representation of multiple segments in the display devices of the applicant according to PCT/EP2018/053496, which is to be incorporated here in its entirety, or US 2013/0222384 A1, in each of which the display device comprises a light guiding device, using which holographic segments of an image of a spatial light modulation device can be generated. This is performed in this case by juxtaposing segments of the field of view, where the individual segments of the image each represent one segment of the field of view. However, it also applies in this display device to the individual segment of the image that the decoupled angular spectrum and thus the associated field of view of the segment corresponds to the coupled-in angular spectrum of the light.

However, this is not the case with the display device according to the present invention, because here the angular spectrum of the light coupled out of the light guiding device and thus the field of view generated thereby is enlarged in comparison to the angular spectrum of the light coupled into the light guiding device. In this manner, a very large field of view can be generated or achieved, for example, for a stereoscopic representation of an object or scene. Such a field of view can span, for example, an angular range of approximately 60°. This angular range could be generated in this case using only one single segment or one single image, respectively, of the spatial light modulation device.

A light guiding device for generating a holographic segment is disclosed in document PCT/EP2018/053496 of the applicant. In this case, the coupling of the light into the light guide of the light guiding device takes place in such a way that, except for diffraction angles of the pixels of a spatial light modulation device, the light from all pixels of the spatial light modulation device is incident perpendicularly in each case on the surface of the light guide and on a coupling element. The light propagating in the light guide is then also coupled out again perpendicularly to the surface of the light guide after a fixed number of reflections.

In other light guides according to the prior art, an angular spectrum of the light is coupled at a coupling surface into the light guide and the same angular spectrum, which is therefore not enlarged, is coupled out again at a decoupling surface of the light guide at a defined distance from the coupling surface after a number of reflections in the light guide which differs for the individual angles.

The display device according to the invention can advantageously be combined with the feature of a fixed number of reflections in the light guide. It can therefore advantageously be provided that the light propagates within the light guide via a reflection at boundary surfaces of the light guide, and where the coupling of the light out of the light guide by means of a light decoupling device is provided after a defined number of reflections of the light at the boundary surfaces of the light guide. A controllable element can preferably be provided for varying the defined number of reflections of the light at the boundary surfaces of the light guide. The number of reflections can be changed in a defined manner in this way.

In this manner, the coupling of a defined angular spectrum of the light is combined with a fixedly defined number of reflections in the light guide of the light guiding device for each angle by the optical system in conjunction with the light guiding device to generate a large field of view.

This means that the coupling of the light takes place out of the light guiding device by means thereof at different positions in the light guide after a number of reflections of the light, which is predetermined or predefined beforehand in each case, at the boundary surfaces of the light guide.

The light from different pixels of the at least one spatial light modulation device, which is coupled at different angles in relation to one another into the light guiding device or into the light guide of the light guiding device, covers propagation paths of different lengths in the light guide after a predefined number of reflections and is then coupled out of the light guiding device by means of the at least one light decoupling device. It is possible due to the propagation paths of the light of different lengths in the light guiding device to achieve an enlargement of the decoupling angular spectrum in relation to the coupling angular spectrum in a defined manner.

It can particularly advantageously be provided that if the light incident on the at least one light guiding device is formed as a light bundle or light field, which comprises multiple or a plurality of light beams, a coupling out of the light guide is provided for the light beams after a number of reflections, which is equal in each case for all light beams of the light bundle or light field, at the boundary surfaces of the light guide of the light guiding device.

A light field is to be defined according to the invention by a number of light beams within a specific region. A light field is thus the entirety of all incoming light beams.

In particular when generating a stereoscopic object or scene, it is advantageous that the light from various pixels of the at least one spatial light modulation device is coupled out of the light guiding device after an equal number of reflections but at different positions, so that a uniform stereoscopic image without gaps is represented.

Further advantageous embodiments and refinements of the invention result from the further dependent claims.

A defined geometrical path is present in a light guide. Therefore, during the propagation of the light in a light guide, the optical path in the light guide and the number of reflections at its boundary surfaces are definable in particular. In this manner, it is therefore predetermined after which predefined number of reflections at the boundary surfaces of the light guide the light is to be coupled out therefrom.

It can therefore be provided according to the invention that a light incidence position on one of the boundary surfaces of the light guide, which the light from this pixel reaches after a defined number of reflections, is determinable for each pixel of the at least one spatial light modulation device from geometrical properties and optical properties of the light guide and optical properties of the light coupling device. In this case, a thickness and/or a possible curvature of the boundary surfaces of the light guide can preferably be usable as geometrical properties of the light guide for determining the light incidence position, where an index of refraction of the light guide material can be usable as an optical property of the light guide.

The computation of a light incidence position and/or a light decoupling position on one of the boundary surfaces of the light guide can be performed according to the procedure described in PCT/EP2018/053496, which is to be incorporated here in its entirety.

The geometry of the light guide is to be understood here as the thickness and a possible curvature of the light guide, which can be different depending on the embodiment of the light guide. The optical properties of the light coupling device relate here to at least one element provided in the light coupling device, for example a grating element. If the light coupling element is a grating element, the optical property which influences the number of reflections of the light in the light guide is then the grating period of the grating element. To determine the desired number of reflections within the light guide, the thickness and a possibly present curvature of the light guide and the optical property of the coupling element, in the present example the grating period of the grating element, are therefore used and taken into consideration. A required or desired number of reflections of the light in the light guide is then determined and defined from these values. The grating equation is typically known as $\sin \beta_{out} = \lambda/g + \sin \beta_{in}$, where g is the grating period, $\lambda$ is the wavelength of the light, $\beta_{in}$ is the angle of incidence of the light, and $\beta_{out}$ is the emergent angle of the light. However, the equation only applies in this form if the index of refraction of the medium in the light path is equal before and after the grating element. If a coupling element is used for the coupling of light from air into the medium of a light guide, the index of refraction of the light guide $n_{lightguide}$ is additionally to be considered: $n_{lightguide} \sin \beta_{out} = \lambda/g + n_{air} \sin \beta_{in}$.

For example, if an average light beam of a light bundle of the wavelength $\lambda = 532$ nm is incident from air perpendicularly onto the coupling element and the coupling element has the grating period $g = 400$ nm and the light guide material has the index of refraction $n_{lightguide} = 1.6$, an angle $\beta_{out}$ of 56.2° may thus be calculated, at which the light beam propagates after the coupling into the light guide. In a flat light guide of the thickness $d = 3$ mm, the light beam reaches, for example, after a reflection on the opposing side of the light guide after the distance $2d \tan \beta_{out}$ of, in this case, 8.96 mm, the surface of the light guide again on the side on which it was coupled in. After five reflections, the light beam could accordingly be coupled out of the light guide again at a distance of $5 \times 8.96 = 44.8$ mm from the coupling position.

If, for example, an average light beam of a light bundle originating from a different pixel of the spatial light modulation device having the same wavelength $\lambda = 532$ nm is incident not perpendicularly but rather at an angle of 10° from air on the coupling element and if the coupling element again has the grating period $g = 400$ nm and the light guide material again has the index of refraction $n_{lightguide} = 1.6$, an angle $\beta_{out}$ of 70.0° may again be calculated using $n_{lightguide} \sin \beta_{out} = \lambda/g + n_{air} \sin \beta_{in}$, at which the light beam propagates after the coupling in the light guide. In a flat light guide of the thickness $d = 3$ mm, the light beam again reaches, for example after a reflection at the opposing side of the light guide after the distance $2d \tan \beta_{out}$ of in this case 16.48 mm, the surface of the light guide at the side at which it was coupled in. After five reflections, accordingly the light beam could be coupled out of the light guide again at a distance of $5 \times 16.48 = 82.42$ mm from the coupling location.

If an observer region is located, for example, at a distance of 30 mm from the light guiding device and the perpendicularly incident light beam is also coupled out perpendicularly of the light guiding device, and if the light beam coupled in from air at 10° is coupled out in such a way that it also extends further in the direction of the observer region, a decoupling angular spectrum of a $\tan((82.42-44.8)/30) = 51°$, thus results, which represents an enlargement by a factor of approximately 5 in relation to the coupling angular spectrum of 10°.

The determined values can preferably be saved or stored in a value table (lookup table). The saving or storing of the values thus determined for the number of reflections of the light in a look-up table can be advantageous in that in this manner determining these values once again is not necessary and the computational effort can thus be reduced. The values can then simply be taken from the look-up table and used accordingly.

In one advantageous embodiment of the invention, it can be provided that an image of the at least one spatial light modulation device is provided by means of the at least one light guiding device and the at least one optical system.

In this case, the image can define a field of view within which an item of information of a scene which is encoded in the at least one spatial light modulation device can be represented.

In particular for a stereoscopic representation of an object or scene, the field of view can be determined in such a way that a field of view is definable by propagation paths of different lengths of light from edge pixels of the at least one spatial light modulation device in the light guide and thus different decoupling positions for light of these edge pixels from the light guide and also by a distance of the light guide from a provided observer position, within which field of view an item of information encoded in the at least one spatial light modulation device or displayed item of information of a scene can be represented.

To explain this or the following description of the features of the display device according to the invention, it is firstly to be noted here that in the case of a large field of view, the pupils of an observer of a scene generated using the display device are typically rotated differently when the observer observes different parts of the field of view. A display device or a display having a large field of view and a virtual observer window as observer region is generally also to be understood in the meaning of this application so that the virtual observer window, through which the observer can observe the generated scene, is co-rotated around its center point when the pupil of an eye of the observer rotates. The requirement that a virtual observer window is generated at the same position for all segments of an image of the spatial light modulation device is generally to be understood so that the virtual observer window can also be tilted for each of various segments of an image in relation to one another, but has a common center point. The expression "segments of an image of the spatial light modulation device" is to be understood in the meaning of the invention in such a way that the spatial light modulation device is imaged multiple times and in this manner individual segments are generated, which together result in or form an image of the spatial light modulation device.

If an observer observes various parts of a large field of view and rotates his eye at the same time, the rotation thus takes place around the center point of the lens of the eye, which is located approximately 12 mm behind the pupil. Therefore, a lateral displacement of the pupil position also automatically occurs upon rotation of the lens of the eye. A rotation by 15° corresponds, for example, to a displacement of the pupil by approximately 3.2 mm. For a display device having large field of view, which is generated, for example, using a segmented multiple image of a spatial light modulation device, an alternative embodiment can therefore also intentionally take this change of the pupil position upon rotation of the lens of the eye into consideration in such a way that the virtual observer windows of the individual segments of the multiple image are displaced in relation to one another accordingly. For segments which have a distance of 15° in the field of view, for example, the center point of the virtual observer window would then also be displaced by 3.2 mm in relation to one another, so that it corresponds to the pupil center point upon eye rotation. In this case, each segment thus intentionally has a slightly displaced position and possibly a tilted alignment of a virtual observer window in addition.

The curvature of a light guide can be adapted, for example, so that this displacement results for a coupling of light out of the light guide, which is perpendicular in relation to the surface of the light guiding device, at an observer distance from the light guide surface.

In the display device according to the invention, the coupling out of light takes place at different positions in the light guiding device after a respective predetermined number of reflections of light at the boundary surfaces of the light guide.

As already mentioned, a defined geometrical path is present in a light guide. Therefore, during the propagation of the light in a light guide, the optical path in the light guide and the number of reflections at the boundary surfaces of the light guide can be defined. Therefore, the length of a used light guide can be predefined, the focal lengths of imaging elements of the optical system and the distances of a spatial light modulation device and a virtual observer window or sweet spot can be set from the light guiding device in such a way that a specific imaging beam path and/or illumination beam path is settable. The used term "observer region" is to include both, a virtual observer window or a sweet spot, depending on whether the display device according to the invention is designed as a holographic and/or stereoscopic display device.

In one particularly advantageous embodiment of the invention, it can be provided that a light source image of at least one light source provided in an illumination device or an image of the spatial light modulation device is provided by means of the optical system in the light path before a coupling of the light into the light guiding device.

In this case, the light coupling device can preferably be provided at or in a region of a position of a light source image.

The coupling of the light into the light guide of the light guiding device takes place according to the invention at or close to the position of a light source image. The light which is modulated and emitted by the at least one spatial light modulation device is directed and focused and/or imaged by means of the optical system, for example, by means of at least one imaging element, on the light coupling device of the light guiding device, which is combined with the light guide, so that the light from the individual pixels of the at least one spatial light modulation device is incident at different angles on the light coupling device. After the coupling of the light into the light guide by means of the light coupling device, the light incident at different angles is deflected in such a way that this light propagates at different angles in the light guide. After a permanently predefined number of reflections, the light propagating at different angles also covers light paths or propagation paths of different lengths in the light guide. With an increasing number of reflections of the light in the light guide, the path difference between light beams having two different propagation angles increases. According to the invention, after a predetermined or predefined number of reflections, the light is then coupled out of the light guide again by means of the light decoupling device and thus coupled out of the light guiding device. This can preferably take place perpendicularly in relation to the surface of the light guide in the case of a curved light guide. In this case, the individual decoupled light beams would meet or intersect in the center of the circular arc which the curved light guide forms. In this case the decoupling angular spectrum is defined by the different angles at which the light extends in relation to the center of the circular arc. Because of the paths of different lengths of the light beams having different propagation angles in the light guide and accordingly decoupling positions of the light beams different from one another on the light guide, a field of view results for the eye of an observer from the center point or center of the circular arc in relation to the light guiding device which is enlarged in comparison to the coupled-in angular spectrum or coupling angular spectrum of the light.

The light decoupling device can comprise at least one mirror element or at least one grating element, which is designed as a passive or controllable grating element.

In one embodiment of the invention, the light coupling device can comprise at least one mirror element for coupling the light into the light guide. The mirror element can be designed as a beveled and mirrored surface, which is provided on an inner side or on a boundary surface of the light guide.

In another embodiment of the invention, the light coupling device can comprise at least one grating element for coupling the light into the light guide. In particular if grating elements are used to couple light into the light guide, these grating elements are to be capable of coupling the entire angular spectrum of the light which originates from the individual pixels of the at least one spatial light modulation device with a high efficiency.

A grating constant of the grating element or an angle of inclination of the mirror element in relation to the surface of the light guide can advantageously be used as an optical property of the light coupling device for determining the light incidence position, which the light reaches after a defined number of reflections.

It can furthermore advantageously be provided that the at least one light decoupling device is provided in the at least one light guiding device in such a way that the dimensions and the position or the location of the light decoupling device comprise all light incidence positions which the light from different pixels of the spatial light modulation device reaches on one of the boundary surfaces of the light guide after a defined number of reflections.

In this manner, it can be ensured that the light is also coupled out of the light guide at the predefined location of the light guide. The dimensions of the light decoupling device are to comprise in this case the dimensions of all light incidence positions on which the light emitted from the individual pixels of the at least one spatial light modulation device is incident, so that it is always ensured that all of the light or the entire coupled-in angular spectrum of the light is coupled out.

In one particular embodiment of the invention, it can be provided that the light decoupling device comprises at least one grating element, in particular a deflection grating element, preferably an angle-selective deflection grating element, preferably a volume grating, or at least one mirror element.

The coupling of the light out of the light guide or of the light guiding device can take place in one preferred embodiment of the invention using at least one grating element, preferably a deflection grating element. This deflection grating element can be designed as angle-selective, for example, a volume grating. Instead of at least one grating element, at least one mirror element can also be used in the light decoupling device for coupling out the light. In this case, the mirror element can comprise an inclined mirror surface in relation to the surface of the light guide.

The at least one grating element can moreover be designed as controllable, where the grating period of the grating element is variably controllable in dependence on the light incidence position, which the light reaches in the light guide after a defined number of reflections, or in dependence on the light incidence angle, which the light has in the light guide after a defined number of reflections. In this manner, it can be intentionally controlled after how many reflections of the light in the light guide the light is to be coupled out. The number of reflections at the boundary surfaces of the light guide can thus be varied.

In the case of a solely stereoscopic representation, it is not necessary that the at least one grating element and thus the light decoupling device have to be designed as controllable.

In the case of a holographic three-dimensional representation, which can also be combined with a stereoscopic representation of an object or scene, however, it is necessary that the at least one grating element is designed as controllable to couple out and generate multiple segments of the image of the at least one spatial light modulation device accordingly and thus achieve a large field of view.

Light or light beams which propagate in the light guide of the light guiding device at different angles to one another in each case can be incident after a different number of reflections on the same decoupling surface of the light decoupling device, however. For example, the regions in which the propagating light beams are incident after three reflections or after four reflections at the boundary surfaces of the light guide would overlap on an inner side of the light guide. To achieve the desired coupling of the light out of the light guide after a predefined number of reflections, light beams are to be prevented from being coupled out inadvertently after an excessively small number of reflections. Various options can be provided for this purpose. In one embodiment, for example, an angle-selective deflection grating element, for example, a volume grating, can be used to couple the light out of the light guiding device. The angle selectivity of the deflection grating element is set in this case in such a way that only light of the propagation angle which is to be coupled out at a defined position of the light guide is also deflected with high efficiency by the deflection grating element. For a grating element for which the deflection angle itself is also to change with the position of the grating element on the light guide, however, the setting of a suitable angle selectivity can be more complex.

Therefore, in one preferred embodiment, another option is proposed to avoid the undesired coupling of the light out of the light guide after an excessively early number of reflections. The polarization of the propagating light beams in the light guide can advantageously be set so that the polarization of these light beams differs for an even number and an odd number of reflections. This change of the polarization of the light can be used both for the representation of a stereoscopic segment and also for the generation of holographic segments using a light guide.

The setting of the polarization can advantageously be provided in that the light guiding device comprises at least one retardation layer.

The light guiding device can also comprise at least two retardation layers, where the at least two retardation layers each comprise a birefringent material and the birefringent material of the at least two retardation layers is identical or different.

It can advantageously be provided that the optical axis of the birefringent material of a first retardation layer is oriented in the plane of this layer, where the optical axis of the birefringent material of a second retardation layer is oriented perpendicularly to the plane of this layer.

The at least two retardation layers can be arranged in this case in such a way that the retardation of the first retardation layer decreases with an increasing propagation angle of the light in relation to the retardation layer and the retardation of the second retardation layer increases with an increasing propagation angle of the light in relation to the retardation layer. The thickness of the first retardation layer and the thickness of the second retardation layer can be set in such a way that, for a provided or required propagation angular range of the light, a substantially constant retardation results for both retardation layers in total.

Furthermore, it can be provided that at least one retardation layer is applied on an outer surface of the light guide, and the index of refraction of this retardation layer and the propagation angle of the light propagating in the light guide are selected in such a way that total reflection of the light occurs at the boundary surface of this retardation layer in relation to the surroundings of the light guide. In another embodiment, an additional mirror layer can also be applied to the boundary surface of this retardation layer in relation to the surroundings of the light guide, for example, a dielectric layer or also a metal layer, so that instead of total reflection, a reflection takes place at this mirror layer.

The propagation angle of the light in the light guide and the index of refraction of this retardation layer are selected so that total reflection still occurs at the boundary surface of this retardation layer to the surroundings of the light guide, for example, to the ambient medium air. The thickness of the at least one retardation layer is designed so that after a first or initial passage of the light through the at least one retardation layer, reflection is provided at the boundary surface to the surroundings of the light guide, and after a subsequent further passage of the light through the at least one delay layer, in the case of linearly polarized incident light, the polarization of the light is rotated by 90°, or in the case of circularly polarized incident light, the sense of rotation of the circularly polarized light is changed, from left-circular into right-circular or vice versa. In other words, it can advantageously be provided that the respective thickness of the at least one retardation layer and also the respective birefringence and the alignment of the optical axis of the at least one retardation layer are formed in such a way that upon incidence of linearly polarized light and for the average propagation angle of the light propagating in the light guide, after initial passage of the light through the at least one retardation layer, reflection is provided at the boundary surface to the surroundings of the light guide and after further passage of the light through the at least one delay layer, for linearly polarized incident light, the polarization state of the light is rotated by 90°, or for circularly polarized incident light, the sense of rotation of the circularly polarized light is changed.

In another embodiment of the invention, a formation of the at least one retardation layer can be performed for the entire propagation angular range. For the entire propagation angular range, this then means that the respective thickness of the at least one retardation layer and the respective birefringence and the alignment of the optical axis of the at least one retardation layer are formed in such a way that upon incidence of linearly polarized light and for the entire propagation angular range, which is defined by the coupling angular range and the light coupling device, of the light propagating in the light guide, after a first passage of the light through the at least one retardation layer, reflection at the boundary surface to the surroundings of the light guide is provided, and after a further passage of the light through the at least one retardation layer, the polarization state of the light is rotated essentially by 90° or, for circularly polarized incident light, the sense of rotation of the circularly polarized light is changed.

For the embodiment which takes into consideration the entire propagation angular range, for example, more retardation layers can be used than for an embodiment which only takes into consideration an average propagation angle. For example, an embodiment for an average propagation angle can comprise a single retardation layer, an embodiment for an entire propagation angular range, however, can comprise two retardation layers. In the latter case, there is the option of forming the thickness of the first and the second retardation layer and the birefringence of the first and retardation delay layer and the alignment of the optical axis of the first and the second retardation layer in each case in such a way that the desired polarization change results overall over the propagation angular range. However, the invention is expressly not to be restricted to these examples having one or two retardation layers.

A single retardation layer is typically wavelength-dependent. A combination of multiple retardation layers can also be formed achromatic, for example. In one preferred embodiment, the at least one retardation layer is formed so that it generates a polarization rotation of incident linearly polarized light or change of the sense of rotation in the case of circularly polarized light both for a propagation angular range and also for blue, green, and red light. So-called color-selective films (CSF) are also known, which rotate the polarization by 90° for a defined wavelength range and let through the light without polarization rotation for other wavelengths. Instead of conventional retardation layers, an embodiment of the invention can also comprise those color-selective films which generate a polarization rotation of incident linearly polarized light or a change of the sense of rotation in the case of circularly polarized light in each case either for only red, green, or blue light for the propagation angular range.

The polarization state of the light in the light guide can be changeable or settable using the at least one retardation layer according to the invention on an outer surface of the light guide, so that the polarization states of the light differ for an even number of reflections and for an odd number of reflections of the light in the light guide.

In a further advantageous embodiment of the invention, it can be provided that a reflective polarization element, preferably a wire grid polarizer, is provided, which is arranged between the light guide and the light decoupling device.

In particular on an inner side of the light guide, which can preferably be curved, a reflective polarization element is provided between the light guide and the light decoupling device. The reflective polarization element can preferably be designed as a wire grid polarizer (WGP). Wire grid polarizers are available as films, for example, so that they can also be applied to curved surfaces, for example, to a curved light guide.

It can advantageously furthermore be provided that the orientation of the reflective polarization element is selectable in such a way that after an odd number of reflections at the boundary surface of the light guide, which is provided with the at least one retardation layer, the light incident on the reflective polarization element is reflected, where after an even number of reflections at the boundary surface of the light guide, which is provided with the at least one retardation layer, the light incident on the reflective polarization element is transmitted, where the even and the odd number of reflections can be exchanged.

The orientation of the reflective polarization element can be selected so that, for example, after an odd number of reflections at the boundary surface or outer side of the light guide, which comprises the at least one retardation layer, the light incident on the polarization element is reflected and propagates further in the light guide without reaching the light decoupling device. After an even number of reflections at the boundary surface or outer side of the light guide, which comprises the at least one retardation layer, the light incident or falling on the polarization element has a polarization which causes this light to be let through or transmitted by the polarization element. The light is then incident after passing the polarization element on the light decoupling device and can be coupled thereby out of the light guide or the light guiding device.

In a further advantageous embodiment of the invention, it can be provided as an alternative to the reflective polarization element that the light decoupling device comprises a polarization-selective grating element.

It can also be provided here that after an odd number of reflections at the boundary surface of the light guide, which is provided with the at least one retardation layer, the light incident on the polarization-selective grating element of the light decoupling device is not deflected by this grating element and is reflected at the boundary surface between the light guide and the surroundings, where after an even number of reflections at the boundary surface of the light guide, which is provided with the at least one retardation layer, the light incident on the polarization-selective grating element of the light decoupling device is deflected by this grating element and exits or is coupled out of the light guide, where the even and odd number of reflections can be exchanged.

Such polarization-selective grating elements deflect, for example, P-polarized light, where S-polarized light is not deflected, however. These polarization-selective grating elements can be designed as transmissive and passive. This is advantageous in particular when generating a stereoscopic segment or a stereoscopic representation. The polarization-selective grating elements can also be designed as controllable or switchable. This is advantageous in particular for generating at least one holographic segment or a holographic representation.

Bragg polarization gratings also exist, which have the property that they deflect right-circular polarized light, but not left-circular polarized light. Such Bragg polarization gratings can therefore also be used in the light decoupling device for coupling light out of the light guiding device or the light guide. In this case, the at least one retardation layer would preferably be designed so that it changes left-circular incident light into right-circular incident light and vice versa.

In a further advantageous embodiment of the invention, it can be provided that a controllable polarization switch is provided, which is arranged in the light direction before the at least one light guiding device.

By means of this controllable polarization switch, which is arranged in the light direction before the light coupling device of the light guiding device in the display device according to the invention, the polarization of the light to be coupled into the light guide can be selected. The controllable polarization switch can be controlled in such a way that either P-polarized light or S-polarized light is coupled into the light guide.

Furthermore, it can be provided in one advantageous embodiment of the invention that the at least one optical system and the at least one light guiding device are provided for generating a stereoscopic or at least one holographic segment, which forms the field of view, of an image of the at least one spatial light modulation device, where a stereoscopic or holographic representation of a scene or an object is provided within the field of view.

The display device according to the invention can be provided for the stereoscopic representation of objects or scenes. This means that only a solely stereoscopic view of an object or a scene is then represented. For this purpose, a field of view, within which an object or a scene is then represented, is spanned by the propagation paths of different lengths of the light which is emitted from the edge pixels of the at least one spatial light modulation device, in the light guide and therefore different decoupling positions and by the distance of the light guide to a position at which an observer is presently located. This large field of view is therefore formed by a single segment generated using the display device and can span or have an angular range up to approximately 70°.

In an alternative embodiment of the display device according to the invention, it can advantageously be provided that the at least one optical system and the at least one light guiding device are provided for generating a stereoscopic and at least one holographic segment or for generating at least two holographic segments, where the stereoscopic segment and the at least one holographic segment or the at least two holographic segments each together form a field of view, within which a three-dimensional scene or a three-dimensional object can be represented.

The optical system and the light guiding device can be designed and combined with one another in such a way that using only a single light guiding device, in chronological succession in the entire range of the field of view, a segment for a stereoscopic representation of an object or a scene is provided or is generated and additionally, only in a targeted or defined region of the field of view, at least one segment having a holographically reconstructed representation of an object or scene is provided or is generated. The stereoscopic and the holographic segments can overlap in this case.

It is also possible to generate a large field of view in the entire region of the field of view by means of a juxtaposition of multiple holographically generated segments, where additionally at least one segment having a holographically reconstructed representation of an object or scene is also provided or is generated only in a defined region of the field of view here. The holographic segments can also overlap in a defined region here.

It is also possible, for example, that only a middle angular range of the field of view is generated by means of a holographically encoded three-dimensional representation, where the angular ranges of the field of view adjoining this middle angular range are generated by means of a two-dimensional or stereoscopic representation of objects or scenes.

In an alternative exemplary embodiment of the invention, two separate light guiding devices can be used. One or both light guides can also be curved at least in sections in the embodiment thereof here. The term "curved in sections" in this document denotes a light guide which is composed of flat and curved sections. A light guiding device is used for the purpose of displaying at least one segment of a holographic reconstruction of a three-dimensional scene or an object, where the other light guiding device is used to generate a stereoscopic representation of an object or scene. If the two light guides of the light guiding devices are formed curved at least in sections, the curved sections of these light guides can have different radii, for example. The two light guiding devices can moreover be arranged one behind another in such a way that an eye of an observer can see and observe a combined holographic and stereoscopic reconstruction through both light guiding devices.

It can advantageously furthermore be provided that the at least one light guiding device comprises two light coupling devices for generating at least two segments of a field of view.

The at least one light guiding device can comprise two light coupling devices to generate at least two segments of the field of view.

The two light coupling devices can preferably be combined with the light guide at a distance from one another or directly adjacent to one another, where light from the at least one illumination device can be coupled into the light guide at different positions by means of the two light coupling devices.

The coupling of light at two different positions into the light guide can optionally be performed using two different spatial light modulation devices, or the light which is modulated and emitted by only one spatial light modulation device can preferably be directed time-sequentially to the one light coupling location or light coupling position or to the other light coupling position of the light guide and coupled therein. In the latter case, the optical system comprises at least one switchable element, for example, a grating element, which alternately directs the light to the one or the other light coupling position, between the spatial light modulation device and the light guiding device.

These at least two generated segments can advantageously overlap and form the field of view, where an overlap region of the two segments has the highest pixel density per degree of viewing angle and corresponds to a central viewing direction of an observer observing a two-dimensional and/or three-dimensional scene.

The pixel density can be increased in the overlap region by the overlap or overlay of the at least two generated segments. Observed generally, the human eye has a significantly lower resolution in the peripheral field of view than in the central field of view. The position of the central field of view can be rotated by rotating the eye. However, rotations of the eye typically only take place in a range of ±15°. In the case of larger changes of the viewing direction, the head would rather be co-rotated. Independently of the actual viewing direction of an observer, it is therefore important to provide a higher density of pixels per degree of viewing angle in the central region of the field of view, for example, in the region around approximately 30°, than further outward in the peripheral region of the field of view.

The number of the pixels of the at least one spatial light modulation device per degree of viewing angle, which is visible to an observer, is not equal over the entire field of view. Rather, a gradient results in the number of the pixels per degree of viewing angle in the field of view. On one side, viewed from the observer, the pixels would be grouped together more densely than on the other side, viewed from the observer.

Therefore, the at least two generated segments are thus advantageously to be provided in front of the eye of the observer in such a way that an overlap region of these two segments having the highest pixel density corresponds to the central viewing direction of the observer and the pixel density decreases with increasing viewing angle out from this overlap region toward both sides of the field of view.

In one preferred embodiment of the invention, gaze tracking can be carried out, i.e., it is detected in which direction an observer eye views or looks. In the viewing direction, the observer can see a scene at the highest resolution, because light is incident from there on the center of the retina of the eye of the observer. Beyond the viewing direction, an observer can see the scene at a lower resolution, because light from there is incident on the peripheral region of the retina of his eye.

A segment having a high pixel density is displaced by setting the number of reflections in the light guide in such a way that it is located in the field of view in the presently detected viewing direction of an observer. A segment having a lower pixel density, for example always having a fixed number of reflections in the light guide, forms a large field of view having lower resolution to represent the peripheral image contents. By displacing the segment having high pixel density, the observer can thus advantageously also see a scene with good resolution if his viewing direction is not central. This configuration can also be expanded to more than two segments having different pixel densities.

In an embodiment of the invention having two segments, it can be provided in this case that one segment of the at least two segments is formed as a stereoscopic segment and another segment of the at least two segments is formed as a holographic segment, where the holographic segment can be generated in the central viewing direction of the observer or in the viewing direction of the observer detected using gaze tracking. In a more general embodiment of the invention having more than two segments, at least one segment can again be formed as a stereoscopic segment and at least one segment can be formed as a holographic segment. One stereoscopic segment can also be combined with two holographic segments or vice versa, for example.

The abovementioned difference in the density of the pixels of the spatial light modulation device per degree of viewing angle is compensated for according to the invention in the represented image contents. This compensation is performed by corresponding scaling and scanning of the represented scenes during the hologram computation or during the encoding of stereoscopic contents in the spatial light modulation device. However, the one boundary region of the field of view would then have a pixel density which can limit the visible resolution. For an advantageous combination of the view of a stereoscopic segment with the view of at least one holographic segment, which has a high number of three-dimensional object points per degree of viewing angle and can be tracked to a viewing direction of the eye of an observer via gaze tracking, however, this would not be particularly disadvantageous, since the generated stereoscopic contents of an object or a scene are only represented and active in a region on the retina of the eye of the observer in which the receptors of the retina only detect at a low resolution in any case.

For a display device which is only to display solely stereoscopic contents or representations in a single large segment, in one embodiment of the invention, an intermediate image of the at least one spatial light modulation device can also be provided, in which the pixels of the spatial light modulation device are enlarged differently. This thus means that on a light coupling side of the light guiding device, the number of the pixels per degree of light coupling angle has a gradient which is oriented opposite to the gradient of the number of pixels per degree of light decoupling angle on a light decoupling side of the light guiding device. By way of the above-mentioned scaling and scanning of the pixel images or the represented content of a scene, where in this case the scaling factor changes with the position in the field of view, the different angular distance of the individual light beams to one another is equalized during the decoupling, so that a number of pixels per degree of viewing angle which is constant over the field of view is again provided.

In an embodiment of the invention alternative thereto, it can be provided that the at least two segments are formed as holographic segments, where an overlap region of the at least two segments corresponds to a central viewing direction or a viewing direction detected by gaze tracking of an observer observing a two-dimensional and/or three-dimensional scene.

In this embodiment of the invention, multiple holographic segments can be generated to achieve a large field of view. These at least two segments or preferably a plurality of holographic segments can also overlap so as not to cause gaps to result in the generated large field of view because of possibly existing aberrations. It is moreover possible here that in addition to the holographic segments which enlarge the field of view as a whole, a holographic segment is also generated which is overlaid or overlapped with the holographic segments enlarging the field of view as a whole. This overlap region is preferably then to correspond to a central viewing direction of an observer or a viewing direction of an observer detected by gaze tracking, where in the latter case this holographic segment, which is overlapped with the other holographic segments, can be tracked to a new position of the viewing direction of the observer via gaze tracking.

Moreover, it can advantageously be provided that at least two light decoupling devices are provided, where a first light decoupling device is provided for decoupling light to generate at least one holographic segment and a second light decoupling device is provided for decoupling light to generate at least one stereoscopic segment.

The case of a display device in which both at least one stereoscopic segment and also at least one holographic segment are to be represented in a large field of view can require, for example, that light possibly has to be coupled out at different angles of the light guide of the light guiding device at the same position or at the same point. For example, the light for a stereoscopic segment is to exit at a different angle from the light guide than light for a holographic segment. It can also be necessary for the case of a display device which comprises at least two holographic segments which overlap that light possibly has to be coupled out at different angles of the light guide of the light guiding device at the same position or at the same point.

To achieve the decoupling of light at various angles, various decoupling elements have to be provided, for example various grating elements having different grating periods. For this purpose, for example, a light decoupling device could comprise a grating element which has a grating period which differs from the grating period of the grating element of another light decoupling device. Therefore, the light guiding device could comprise at least one light decoupling device for at least one holographic segment and at least one light decoupling device for at least one stereoscopic segment. In this case, undesired decoupling of light of the at least one holographic segment by the light decoupling device for the at least one stereoscopic segment and vice versa is advantageously to be prevented.

The light decoupling devices can advantageously be designed as controllable, where the light decoupling devices are each controllable in such a way that in one driving state of the light decoupling devices, light is coupled out after a defined number of reflections, and in another driving state of the light decoupling devices, the light propagates further in the light guide.

The light decoupling devices can comprise switchable or controllable grating elements for this purpose. In this case, in a first switching state of the at least one grating element of the respective light decoupling device, the light propagating in the light guide is coupled out of the light guide and in a second switching state of the at least one grating element, however, the light is not coupled out but rather propagates further in the light guide.

The switchable or controllable grating elements of the light decoupling device can optionally furthermore be divided into sections, which can be switched separately into the state "ON" or "OFF". For a display device in which a single stereoscopic segment is combined with at least one holographic segment, in particular the at least one switchable grating element of the light decoupling device is divided into sections for the decoupling of the light for generating the at least one holographic segment.

In other words, it can be provided that at least one light decoupling device is divided into sections, where the at least one light decoupling device is designed as controllable in sections, wherein the at least one light decoupling device is controllable in such a way that the number of reflections of the light at the boundary surfaces of the light guide is changeable by a driving state of one section of the at least one light decoupling device, which corresponds to the light incidence position which the light reaches after a number of reflections, and by another driving state of a further section of the at least one light decoupling device or by another driving state of a section of a further light decoupling device, which corresponds to the light incidence position which the light reaches after a further number of reflections.

In the case of a decoupling of at least one holographic segment and at least one stereoscopic segment by means of two light decoupling devices, the decoupling of the light for these segments takes place time-sequentially, where in chronological succession the at least one grating element or a section of the at least one controllable grating element of the one light decoupling device and thereafter the at least one grating element or a section of the at least one controllable grating element of the other light decoupling device is switched into the state "ON" and respectively the at least one switchable grating element of the respective other light decoupling device is switched into the state "OFF". It is therefore self-evident that in the same manner the decoupling of multiple holographic segments and possibly of multiple stereoscopic segments is also possible sequentially, for example, by defined sections of the respective light decoupling device being switched into the state "ON".

The decoupling of various segments from the light guide can therefore be controlled in such a way that at least one controllable grating element or individual sections of at least one controllable grating element of at least one light decoupling device is/are controlled for decoupling, i.e., for example, is/are switched on or switched off. A switched-off grating element of the light decoupling device would have the result, for example, that light which is incident on this grating element is not coupled out but rather reflected and propagates further in the light guide and can be coupled out at another position of the light guide after additional reflections.

Such an arrangement of two light decoupling devices in the light guiding device, each of which comprises at least one switchable grating element, could require a large expenditure in the manufacturing and in the operation of such a light guiding device, however. This would apply in particular if the light guide of the light guiding device is formed curved at least in sections. In such a light guide, the grating elements of the controllable light decoupling devices would therefore also each have to have a curvature.

It can therefore be preferable if one light decoupling device of the two light decoupling devices comprises at least one passive grating element and a further light decoupling device of the two light decoupling devices comprises at least one controllable grating element. It is particularly preferable if the further light decoupling device only comprises one switchable or controllable grating element. The number of controllable elements is advantageously reduced hereby, whereby manufacturing expenditure and costs can be reduced.

The at least one grating element of the at least one light decoupling device and also the at least one grating element of the light coupling device can be designed as transmissive or reflective.

In one particularly advantageous embodiment of the invention, it can be provided that a tracking device is provided, which is arranged in the light direction before the at least one light guiding device.

The tracking device can comprise at least one grating element or one variable lens element, where a lens function is written into the at least one grating element.

In this manner, it is advantageously possible, for example, to track or adapt a holographic segment, which is overlapped with at least one stereoscopic segment or with at least one other holographic segment and forms an overlap region having highest pixel density per degree of viewing angle, to a new viewing direction or focus direction of an observer when he changes his viewing direction, so that the observer can observe a three-dimensional object or a three-dimensional scene with a high quality in the formed field of view.

Furthermore, a gaze tracking device can be provided, using which a view of an observer observing the object or scene can be tracked and detected, where the location of an image of the at least one spatial light modulation device or the location of a segment is adaptable using the tracking device to a focus position of an eye of the observer detected by means of the gaze tracking device.

If the display device according to the invention comprises a gaze tracking device and a tracking device, the display device can thus advantageously be implemented as a varifocal display or varifocal display device. Using such a varifocal display device, a flat two-dimensional view of a scene can be represented, where this scene can be displaced in the depth and/or in the z direction, i.e., the distance of the scene from the observer, using the tracking device, which comprises an controllable element, for example a lens element having variable focal length.

A segment of a flat two-dimensional view or representation having variable depth can in turn be combined with holographic segments either using the same light guiding device or using a separate light guiding device for the holographic segments.

It is possible, for example, that a holographic segment which generates a virtual observer window small in its dimensions, which is only, for example, 3 mm to 5 mm large in its dimensions, for example, can be generated using a single parallax encoding of a hologram in the at least one spatial light modulation device, so that a sweet spot is provided or formed in the non-encoding direction of the hologram and a virtual observer window is provided or formed in the other direction, the encoding direction of the hologram.

The light guide of the at least one light guiding device can advantageously be formed at least in sections as curved in at least one direction.

In specific embodiments, it can be preferable for the light guide to comprise a flat or level or planar geometry. This is the case, for example, in applications in which saving space is important, since a flat light guide or a flat light guiding device occupies less structural space than a curved light guide or a curved light guiding device. In other embodiments, for example, especially for a head-mounted display, the light guide can also have a curved geometry. In the general case, the light guide can also be composed of linear and curved sections or also from sections of curvature of different strengths. For example, the light coupling region can be formed flat, but the light decoupling region can be formed curved. In the case of a head-mounted display designed like spectacles, for example, a flat section of the light guide can be arranged laterally to the head in the region of a spectacle temple and a curved section can be arranged in front of the eye of an observer. A curved light guide enables the use of a grating element in the light decoupling device, the decoupling angle of which is not dependent on the position of the grating element on/in the light guide.

The light guide can have the shape of a hollow cylinder at least in sections, where its boundary surfaces are formed as portions of the hollow cylinder having different radii. The light guide can have a shape similar to a semicircle, for example.

The light guide of the light guiding device can alternatively be constructed from glass or an optical plastic.

Furthermore, it can be provided that a virtual observer region is generatable in a plane of a light source image or in a plane of an image of the at least one spatial light modulation device.

An observer can then observe the generated object or the generated scene through this virtual observer region. The term "observer region" used in this document is to include both, a virtual observer window in the case of generating a holographic segment or a sweet spot in the case of generating a stereoscopic segment.

In a further embodiment of the invention, it can be provided that for the image or for a single segment of the image of the at least one spatial light modulation device, the coupling out of light coming from various pixels of the at least one spatial light modulation device after entry into the at least one light guiding device is provided after a number of reflections at the boundary surfaces of the light guide equal in each case for all pixels.

Moreover, it can be provided that for different segments of the image of the at least one spatial light modulation device, the number of reflections of the light at the boundary surfaces of the light guide for generating one segment differs from the number of the reflections of the light at the boundary surfaces of the light guide for generating another segment.

Different segments of an image of the at least one spatial light modulation device can be formed, for example, in such a way that for adjacent segments of an image, for example, adjacent holographic segments, different numbers of reflections are executed at the boundary surfaces of the light guide. However, other arrangements are also possible which generate equal numbers of reflections of the light at the boundary surfaces of the light guide for different segments of an image, for example, but use a displaced light coupling position or a changed coupling angle of the light.

The display device according to the invention can advantageously be designed as a head-mounted display comprising two display devices, where the display devices are each designed according to a display device as claimed in any one of claims 1 to 45 and are respectively assigned to a left eye of an observer and a right eye of the observer.

For a head-mounted display, where the following specifications are not to be reduced thereto but are also to apply generally for other display devices, however, it is advantageous if the horizontal field of view is approximately 60° and the vertical field of view is approximately 30°. The angular range in the field of view for an HD (high definition) viewing experience is to be approximately 7.5°×7.5° up to approximately 20°×20°. Within this angular range, at least one holographic segment is to be generated, which has a very high pixel density per degree of viewing angle and corresponds to the central viewing direction or the detected viewing direction of an observer, so that the observer can observe the generated scene or the object at HD quality.

A lower pixel density, for example, 30 pixels/degree, would be sufficient for a stereoscopic segment having a larger field of view.

LCOS (liquid crystal on silicon)-based spatial light modulation devices having approximately 4000×2000 pixels are available, where this pixel number is sufficient for the representation of both a holographic and also a stereoscopic segment. However, the invention is not restricted to the use of a specific type of spatial light modulation device. For example, the use of spatial light modulation devices having MEMS mirror arrays is also possible. In principle, OLED (organic light-emitting diode) micro-displays can also be used for a stereoscopic segment, where in combination with OLED, however, the use of diffractive elements, for example, grating elements, in the light coupling device and in the light decoupling device is not possible for the stereoscopic segment. The spatial light modulation device can be designed as phase-modulating and/or amplitude-modulating. For a stereoscopic segment, an amplitude-modulating spatial light modulation device is sufficient. However, it is also possible, for example, to use the same phase-modulating and amplitude-modulating spatial light modulation device both for at least one holographic segment and also for at least one stereoscopic segment. A phase-modulating and amplitude-modulating spatial light modulation device can use, for example, a beam combiner, as described in WO 2010/149588 A1 of the applicant.

A virtual observer window generated using the at least one holographic segment, through which the user of the head-mounted display can observe the generated scene or object, can be kept small in its dimensions to be able to use a spatial light modulation device which only has a sufficiently low pixel number. The virtual observer window is generated on the region of the entry pupil of the eye of the user. An aperture could be provided, for example, in the plane of the virtual observer window to block undesired occurring orders of diffraction. The dimensions of the virtual observer window could be, for example, approximately 5 mm×5 mm or also only approximately 3 mm×3 mm, if rapid gaze tracking is provided in conjunction with rapid tracking of the virtual observer window in the event of a change of the viewing position of the user.

The dimensions of the virtual observer window could thus be in a range of 3 mm to 6 mm, horizontal and vertical, if the virtual observer window is to be formed rectangular.

If gaze tracking of the observer eye is performed, a segment having high pixel density can thus be tracked to the detected viewing direction by the number of reflections in the light guide of the light guiding device being set and the decoupling position of the light from the light guiding device thus being changed. In addition, the light coupling position can also be displaced with the aid of a deflection element between the spatial light modulation device and the coupling of the light into the light guiding device and thus with equal number of reflections at the boundary surfaces of the light guide, also the decoupling position of the light. This can be performed, for example, using a controllable grating element.

Tracking to the detected viewing direction, also referred to as scanning hereafter, of the at least one holographic segment or the HD cone, which is formed by the at least one holographic segment having very high pixel density, in the total angular range of the field of view of approximately 60°×30°, could be sufficient as long as the view change of the user is sufficiently slow in relation to the scanning element used for the scanning, which can be, for example, a controllable grating element or also a scanning mirror or also a dielectric wedge. Dielectric designs of the scanning element for scanning avoid the occurrence of diffractive dispersion. Refractive dispersion, in contrast, can be reduced by the use of glass or plastic material having a high Abbe number for the scanning element, where a small refractive dispersion is negligible. However, if the dispersion is too large to refer to it as negligible, but is still sufficiently small, the scanning mechanism can then be used to compensate for these dispersion effects. Small displacements of the virtual observer window can also be compensated for by means of the scanning element.

Alternatively to scanning, an angle-switchable configuration can also be used. For this purpose, a wire grid polarizer can be inserted in the light direction in front of a wedge, where the wedge can also have a reflective rear side, for example. Due to the use of a retardation plate comprising rapid-switching ferroelectric liquid crystals for the polarization switching, the light can be reflected at the wire grid polarizer or at the reflective rear side of the wedge. In this manner, it is possible to switch between two angles. This can be expanded to a plurality of angles, for example, by using a series of these elements. No diffractive dispersion results with this procedure.

However, polarization gratings based on liquid crystals (LCG) can also be used for angle switching, or controllable diffraction gratings.

The use of scanning mirrors, which can be used to track only the view of the user, also includes the option of using deformable mirrors. These deformable mirrors can provide a tilt, i.e., a wedge, and additionally a continuous profile, where the first can be used for tracking the viewing direction and the latter for compensation of aberrations for the respective viewing direction. The aberrations can vary for various angular ranges within the field of view. To take this into consideration, the continuous profile can be set separately for each angular range.

An optical design would typically have the least aberrations in the center of the field of view and increasing aberrations with increasing distance from the center of the field of view.

In one embodiment having deformable mirror, however, the optical design of the entire head-mounted display can also be optimized so that, for example, before an aberration compensation by the deformable mirror, a minimal aberration is not to be found in the center of the field of view, but rather in an oval zone around the center. This is to mean that the correction of aberrations by means of the deformable mirror is also provided in the center, however. The consequence of this is that the angular range in which it is possible to sufficiently compensate for aberrations using the deformable mirror, so that this angular range can be used for HD, can be enlarged in comparison to a typical optical design having minimal aberrations in the center before an aberration compensation by the deformable mirror.

A further option for gaze tracking would be the use of switchable illumination. For example, in this case a birefringent wedge could be used, which generates different optical wedge angles for two light beams polarized orthogonally to one another. Switching of the polarization can also be used in this manner.

As already mentioned, an aperture can be provided in the plane of the virtual observer window. In this manner, orders of diffraction caused by the spatial light modulation device can be eliminated. A second effect is that the aperture reduces the numeric aperture of the optical system, which is applied to image the spatial light modulation device virtually in a plane. However, this does not represent a problem as long as the dimensions of the virtual observer window are at least as large as the entry pupil of the eye of the user.

A further important feature is represented by rapid and precise gaze tracking of the user, in particular if the generated virtual observer window is only, for example, approximately 4 mm×4 mm in size. For example, infrared illumination and one camera per eye of the user can be used for this purpose. In general and also in a head-mounted display, the gaze tracking can be combined with an eye tracking. The data obtained by the gaze tracking can be used to direct or orient the HD cone where it is required. In parallel thereto, in the at least one stereoscopic segment, the portion of the represented scene is blanked out, for example, by setting pixel values to black, which is represented using the at least one holographic segment of high pixel density.

The advantage of the generation of at least one holographic segment in the field of view, within which a holographically generated three-dimensional object of a scene is visible at a high resolution, and the generation of at least one stereoscopic segment in the field of view, within which a stereoscopically generated three-dimensional or two-dimensional object or objects of the same scene is/are visible at a lower resolution, where the at least one holographic segment is overlaid or overlapped with the stereoscopic segment and in this manner the field of view is formed, is that the holographic segment only has to be generated in an angular range of approximately ±7.5° up to ±15°. In this manner, the generation of the entire field of view can be carried out very rapidly, since the computational effort can be substantially reduced by the generation of a stereoscopic segment and at least one holographic segment in comparison to if only holographic segments were generated. For this purpose, for example, a complex-valued spatial light modulation device can be used, which comprises approximately 2000×2000 complex-valued pixels. For example, this can be a phased-LCOS modulator having approximately 4000×2000 phase pixels in combination with a beam combiner, which combines each two phase pixels to form a complex value. However, the invention is expressly not to be restricted to specific pixel numbers or the use of specific types of spatial light modulators or specific types of generation of complex-valued (amplitude and phase) modulation.

In a display device which is to reproduce colored scenes, light of red, green, and blue wavelength can be applied in chronological succession, for example, to the light guiding device. The reproduction of colored scenes is not restricted to the use of RGB once per frame, however. For example, a rolling frame sequence rGBr|gBRg|bRGb|rGBr can be implemented, where therefore each frame (single image) consists of four parts and specific single colors are used twice per frame. rGBr means, for example, that the red part contents are displayed twice, once at the beginning and once at the end of the frame, and green and blue are displayed once inbetween.

In a display device which is to reproduce colored scenes, alternatively the use of separate spatial light modulation devices for red, green, and blue light can also be provided, where the light of various wavelengths can then be combined by an optical system between the spatial light modulation devices and the light guiding device.

The present object is furthermore achieved by a method having the features described in the claims.

The method according to the invention for generating a large field of view, within which a scene or an object is represented stereoscopically and/or holographically, by means of at least one spatial light modulation device having pixels and at least one light guiding device is carried out as follows:

the at least one spatial light modulation device modulates incident light with required information of the scene or of the object, the modulated light is formed by means of an optical system in such a way that the light originating from the pixels of the at least one spatial light modulation device is incident on the light guiding device at different angles on average in relation to the surface of the at least one light guiding device and coupled in, whereby a coupling angular spectrum is defined, where the light propagating in the at least one light guiding device is coupled out of the at least one light guiding device at different angles on average in relation to an observer region, whereby a decoupling angular spectrum is defined, where the decoupling angular spectrum is enlarged in comparison to the coupling angular spectrum.

An image of the spatial light modulation device and/or an image of the spatial light modulation device composed of segments is advantageously generated.

A light source image can be generated in the region of the light coupling device.

There are various options for configuring the teaching of the present invention in an advantageous manner and/or combining the exemplary embodiments and/or configurations described above and below with one another. For this purpose, reference is to be made, on the one hand, to the patent claims depending on the independent patent claims and, on the other hand, to the following explanation of the preferred exemplary embodiments of the invention on the basis of the drawings, in which generally preferred configurations of the teaching are also explained. In this case, the invention is explained in principle on the basis of the described exemplary embodiments.

DETAILED DESCRIPTION OF THE INVENTION

Figure 1A:
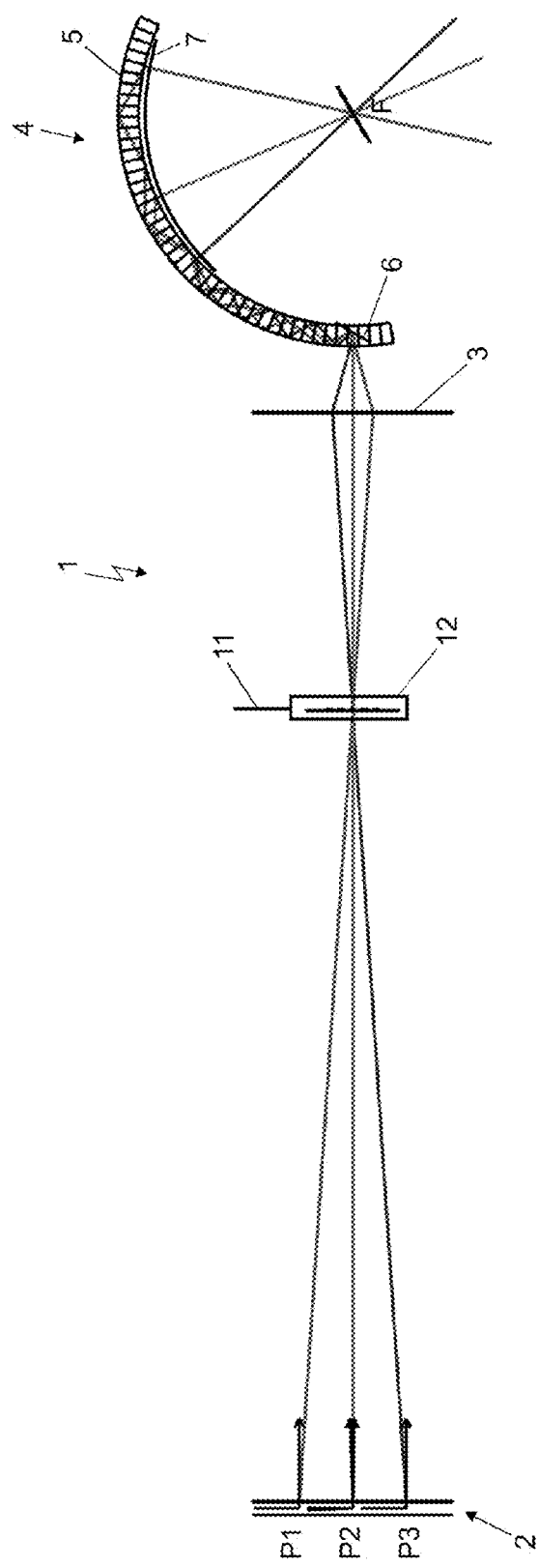
FIG. 1a: shows a schematic illustration of a holographic display device according to the invention.

It is to be briefly mentioned that identical elements/parts/components also have identical reference signs in the figures.

To understand the exemplary embodiments now described, firstly the imaging beam path and the illumination beam path and the relationship of size of an observer region, i.e., a virtual observer window or a sweet spot, and the field of view in a display device, in particular on the basis of a simple holographic head-mounted display, without the use of a light guide, are to be explained. When the term "observer window" is used hereafter, this can also be understood as a "sweet spot" if a stereoscopic segment is generated, for example. This display device comprises an illumination device, a spatial light modulation device, which is referred to hereafter as an SLM, and an optical system, which comprises idealized lenses for the explanation here, i.e., thin lenses without aberrations. Such a display device would only have a limited field of view.

In particular, the field of view has a fixed relationship to the size of the virtual observer window in particular, since both are dependent on the focal length of the optical system of the display device. If the virtual observer window is enlarged, the field of view thus becomes smaller in its size and vice versa. In general, the optical system used influences both the illumination beam path and also the imaging beam path inside the display device.

The optical system of the display device can in general comprise not only one imaging element but rather also multiple imaging elements. A total focal length and a principal plane of the system may then be determined according to known methods of geometrical optics. The above statements then apply accordingly to the overall system.

If a light guiding device is introduced into such a display device, which has an optical system having multiple imaging elements, and if a single image of the SLM is used, thus a fixed coupling position and a fixed decoupling position of the light incident and propagating in the light guiding device, the optical path between the coupling position and the decoupling position of the light on the light guide of the light guiding device thus has to be taken into consideration in the distances between the SLM, the imaging elements of the optical system, and the virtual observer region in the imaging beam path and illumination beam path.

In the exemplary embodiments described hereafter, a large field of view is generated by means of a display device. The field of view is constructed in this case from at least one stereoscopic segment and/or at least one holographic segment. This segment is an image of the SLM or an image of an order of diffraction in a Fourier plane of the SLM, or in the case of a stereoscopic segment, it is defined by the propagation paths of different lengths of the light from the edge pixels of the SLM in the light guide of the light guiding device and by the distance of the light guide to a provided observer position. In other words, if a stereoscopic representation is generated, it is sufficient to generate only one single stereoscopic segment using the display device. This single stereoscopic segment can already generate a large field of view which spans an angular range of, for example, approximately 60°. However, it is also possible to generate multiple stereoscopic segments if the size of a field of view should make this necessary. Since a person in his natural surroundings can only acquire and perceive a limited spatial angle at a high resolution and with a strong three-dimensional impression, it is possible to accept this fact and utilize it. It is thus possible that the objects of a scene which an observer of this scene does not observe or focus on directly but rather are only perceived in the background can be represented at a lower resolution. The observer would perceive the objects in the background with a lesser three-dimensional impression because of the above-mentioned fact. Therefore, the background of a scene to be represented comprising a plurality of objects, which is visible in the entire field of view, can be generated by a stereoscopic segment, which can in turn form the entire field of view. If at least one stereoscopic segment is generated in a display device in each case for the left eye and in a separate display device for the right eye, a stereoscopic scene can be represented three-dimensionally in the manner routine for stereoscopy by displaying an item of parallax information between the left and the right views.

An object or objects targeted or focused on by the observer are to have a strong three-dimensional impression, however. These objects only have to be represented at a high resolution in a limited spatial angular range of the field of view, however. For this purpose, at least one holographic segment is generated by means of the display device. Depending on how large the spatial angular range is, multiple holographic segments can also be generated, which are juxtaposed to generate this spatial angular range. The three-dimensional object focused on by the observer is reconstructed and represented within this holographically generated segment. This means the holographic segment is generated within the stereoscopically generated large field of view, where the holographic segment is overlaid or overlapped with the stereoscopic segment. Since the single segment is an image of the SLM and thus also an image of the pixels of the SLM, the at least one holographic segment represents an image having higher pixel density, the at least one stereoscopic element generally represents an image having lower pixel density. Stereoscopic contents are blanked out, for example, in the respective overlap region of the stereoscopic and holographic segments by corresponding pixels of the SLM being set to an amplitude of zero and thus to black in the stereoscopic segment.

If a stereoscopic segment generates, for example, a field of view of 60°×30° and a holographic segment generates a field of view of 8°×8°, i.e., approximately 13% of the width and 26% of the height of the stereoscopic segment, thus, for example, a corresponding larger region of the stereoscopic scene would thus be made black by the amplitude 0 (zero) being encoded in the SLM. This portion of the scene would thus be missing from the stereoscopic scene, where this portion is instead computed as a hologram and displayed in the holographic segment. To avoid an abrupt transition from the holographic scene to the stereoscopic scene, which an observer could perceive as annoying, for example, this blackening of the stereoscopic scene can be omitted, for example, close to the boundary of the overlapping region of the holographic and stereoscopic segments.

However, the invention is not to be restricted to the combination of holographic representation and stereoscopic representation. It is also possible to also use the light guiding device to generate only a solely stereoscopic view or representation.

The light guiding device used in the display device for generating a stereoscopic segment and/or at least one holographic segment is combined with the feature of coupling an angular spectrum of the light having a predefined number of reflections of the light into a light guide of the light guiding device for each coupling angle.

Figure 1B:
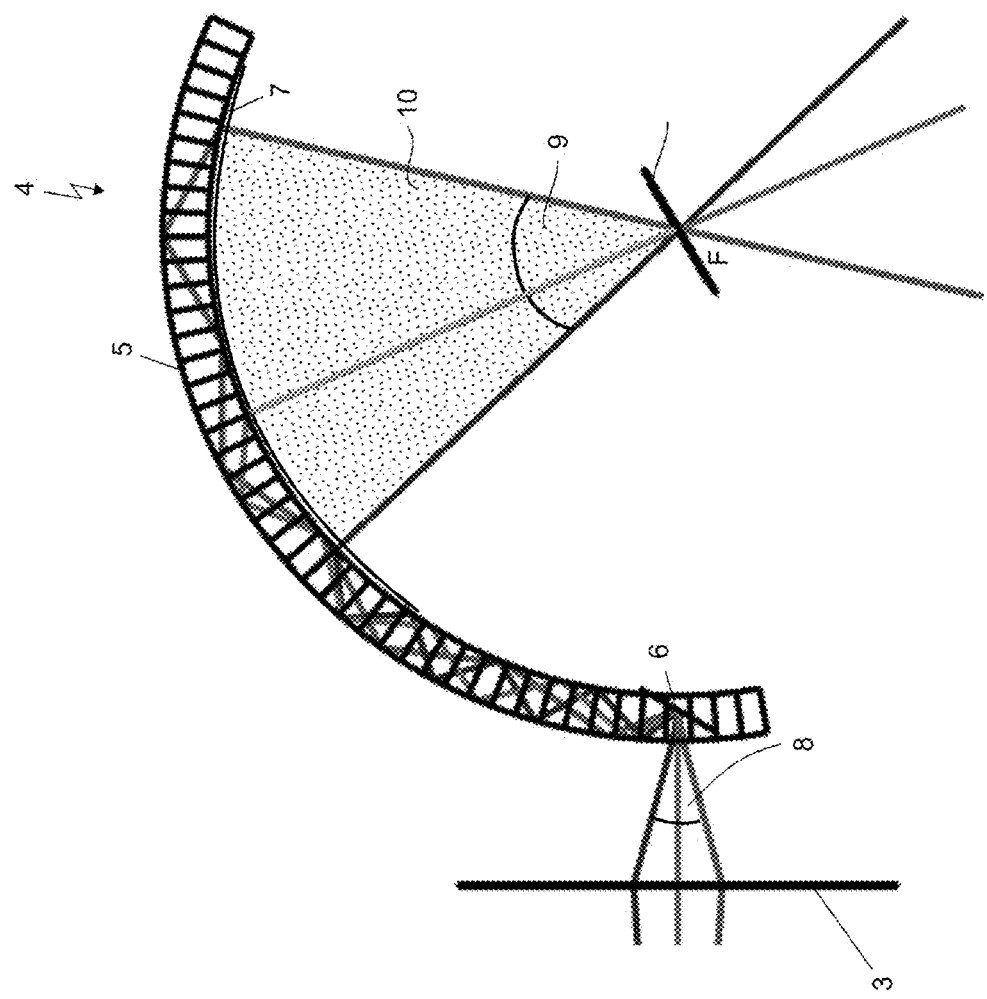
FIG. 1b: shows an enlarged detail of the light guiding device of the display device according to FIG. 1.

An exemplary embodiment is illustrated in this regard in FIGS. 1a and 1b, where FIG. 1b shows an enlarged view of a light guiding device illustrated in FIG. 1a. The display device 1 shown in FIG. 1a comprises an illumination device (not shown), which comprises at least one light source, an SLM 2, an optical system, in the form of an imaging element 3 here, and a light guiding device 4. The light guiding device 4 comprises a light guide 5, a light coupling device 6, and a light decoupling device 7. The light guide 5 is embodied curved here. In this exemplary embodiment, the light coupling device 7 comprises a mirror element for coupling light into the light guide 5, where the mirror element is formed as a beveled and mirrored surface, which is arranged in the light guide 5. The light decoupling device 7 comprises a grating element here. The grating element has a grating period varying with the light incidence position in this case, to permit coupling of the light out of the light guiding device 4 perpendicularly to the surface of the light guide 5 at every light incidence position. To enlarge the field of view, the light emitted by the illumination device is directed onto the SLM 2 and modulated thereby in accordance with the information of an object to be represented or a scene to be represented. This modulated light, which only originates here for the sake of clarity from three pixels P1, P2, and P3 of the SLM 2 and is represented by three light beams in different grayscales, is focused by means of the optical system, accordingly here by means of the imaging element 3, on the light coupling device 6, so that an image of the light source of the illumination device results or is generated there. In this manner, the light originating from the individual pixels P1, P2, P3, . . . PN of the SLM 2 is incident at different angles on average on the light guiding device 4, in particular on the light coupling device 6, and is coupled by this light coupling device 6 into the light guide 5. A coupling angular spectrum 8 of the light is thus defined, as illustrated in FIG. 1b. The three light beams coming from the pixels P1, P2, and P3 are thus incident at different coupling angles on the light coupling device 6. These three light beams are coupled in this case by means of the mirror element of the light coupling device 6 into the light guide 5 and thereafter propagate at different propagation angles in the light guide 5 with total reflection at the boundary surfaces of the light guide 5. The coupled-in angular spectrum or the coupling angular spectrum 8 is in this case approximately 30° in air and 20° within the light guide 5. After a predetermined or predefined number of reflections of the light in the light guide 5, this light is coupled out of the light guide 5 again. In this exemplary embodiment, the coupled-in light beams are coupled out of the light guide 5 again by means of the light decoupling device 7, thus here by means of the grating element, after four reflections at each of the inner and outer surfaces or boundary surfaces of the light guide 5. The light propagating in the light guiding device 4 or in the light guide 5 is coupled out in this case perpendicularly in relation to the local surface of the light guide 5, but because of the curvature of the light guide 5 at different angles on average in relation to an observer region, of the light guiding device 4 or the light guide 5. A decoupling angular spectrum 9 of the light is thus defined, as can be seen more clearly in FIG. 1b. As is apparent in both FIGS. 1a and 1b, after the coupling of the light out of the light guide 5, a field of view 10 results as seen from a focal point F of the light beams, which is to be apparent here by way of a dotted shading. The field of view 10 generated here has an angular range of approximately 56°. As is thus apparent, the decoupling angular spectrum 9 of the light is thus approximately twice as large as the angular spectrum 8 of the light coupled into the light guide 5. A large field of view can thus be generated in this manner, within which a stereoscopic and/or holographic representation can be generated. The generation of a large field of view is thus performed by the generation of at least one stereoscopic segment and/or at least one holographic segment, where the segment or segments form the field of view together. The enlargement of the field of view by propagation of an angular spectrum of the light and coupling out of the light after a predetermined number of reflections is not to be restricted to a curved light guide as shown here, however, but rather would also be applicable in the same manner in the case of a planely formed light guide in a light guiding device.

As is apparent in FIG. 1a, a beam path from the SLM 2, which is illuminated using parallel light emitted by the illumination device, is illustrated therein up to the coupling into the light guiding device 4. As already mentioned, an image of a light source of the illumination device is generated in the region of the light coupling device 6. However, an image of the light source already results in the light direction before the imaging element 3 of the optical system, where this image plane of the light source is provided with the reference sign 11 in FIG. 1a. This image of the light source is generated using other imaging elements (not shown) of the optical system. A pair of crossed, i.e., rotated by 90° to one another, liquid crystal grating elements (LCG) 12 is arranged in this image plane 11. By encoding a lens function in the two liquid crystal grating elements 12, the image plane of the SLM 2 can be displaced. Instead of liquid crystal gratings, another form of a variable lens element can also be used for displacing the image plane of the SLM 2. In conjunction with a gaze tracking device provided in the display device 1, a stereoscopic segment can be implemented or generated which has an adaptive focus. If the gaze tracking is carried out for both eyes of an observer, the depth at which one eye of the observer focuses can thus be detected from the vergence angle of the viewing directions for both eyes of the observer. For the generated stereoscopic segment, the image plane of the SLM 2 is then shifted by means of the lens function encoded in the liquid crystal grating elements into this detected depth, so that the observer of the represented scene can perceive it without interfering accommodation-vergence conflict. The computation of contents of the stereoscopic scene can also be adapted for this purpose, so that parts of the scene which are located in the detected depth are represented sharply and parts of the scene which are located at other depths are intentionally represented fuzzily. This tracking of the image plane of the SLM for the stereoscopic segment can also be combined with the generation of at least one holographic segment. If a combination of a stereoscopic segment with at least one holographic segment is provided, a gaze tracking device can also be provided. Using such a gaze tracking and tracking device, both the position of the holographic segment in the field of view can be displaced in accordance with the viewing direction of the respective eye of the observer, and also the depth of the image of the SLM can be adapted for the stereoscopic segment. The greatest lateral resolution and a complete three-dimensional depth of the represented scene or object thus results in the central region of the retina. Outside the central region of the retina, only a two-dimensional scene or object is then provided in the stereoscopic segment. However, a possible accommodation-vergence conflict is also avoided outside the central region of the retina by the tracking of the depth of the image of the SLM. The human eye can resolve the depth of objects only roughly or no longer at all in the peripheral vision region or field of view. Nonetheless, an improvement of the image quality is achieved overall if the image contents or the objects of a scene to be represented are adapted to the focus position of the eye of the observer over a larger angular range of the field of view than the portion which is covered by the holographic segment.

Light or light beams which each propagate at different angles in relation to one another in the light guide 5 of the light guiding device 4 can be incident after a different number of reflections on the same decoupling surface of the light decoupling device 7, however. For example, the regions in which the propagating light beams are incident after three reflections or after four reflections at the boundary surfaces of the light guide 5 would overlap on an inner side of the light guide 5. To achieve the desired coupling of the light out of the light guide 5 after a predefined number of reflections, light beams are to be prevented from also being coupled out after reaching an excessively small number of reflections. Various options can be provided for this purpose. For example, an angle-selective deflection grating element can be used to couple the light out of the light guiding device 4 for this purpose. The angle selectivity of the deflection grating element is set in this case so that only light of the propagation angle which is to be coupled out at a defined position of the light guide 5 is also deflected with high efficiency by the deflection grating element. The setting of a suitable angle selectivity can be more complex for a grating element for which the deflection angle itself is also to change with the position of the grating element on the light guide, however.

Another option for preventing the undesired coupling of the light out of the light guide 5 after an excessively early number of reflections would be the setting of the polarization of the light. The polarization of the propagating light beams in the light guide 5 is set in this case so that the polarization of these light beams differs for an even number and an odd number of reflections. This change of the polarization of the light can be used both for a stereoscopic representation and also for a holographic representation of objects or scenes using a light guiding device.

Figure 2:
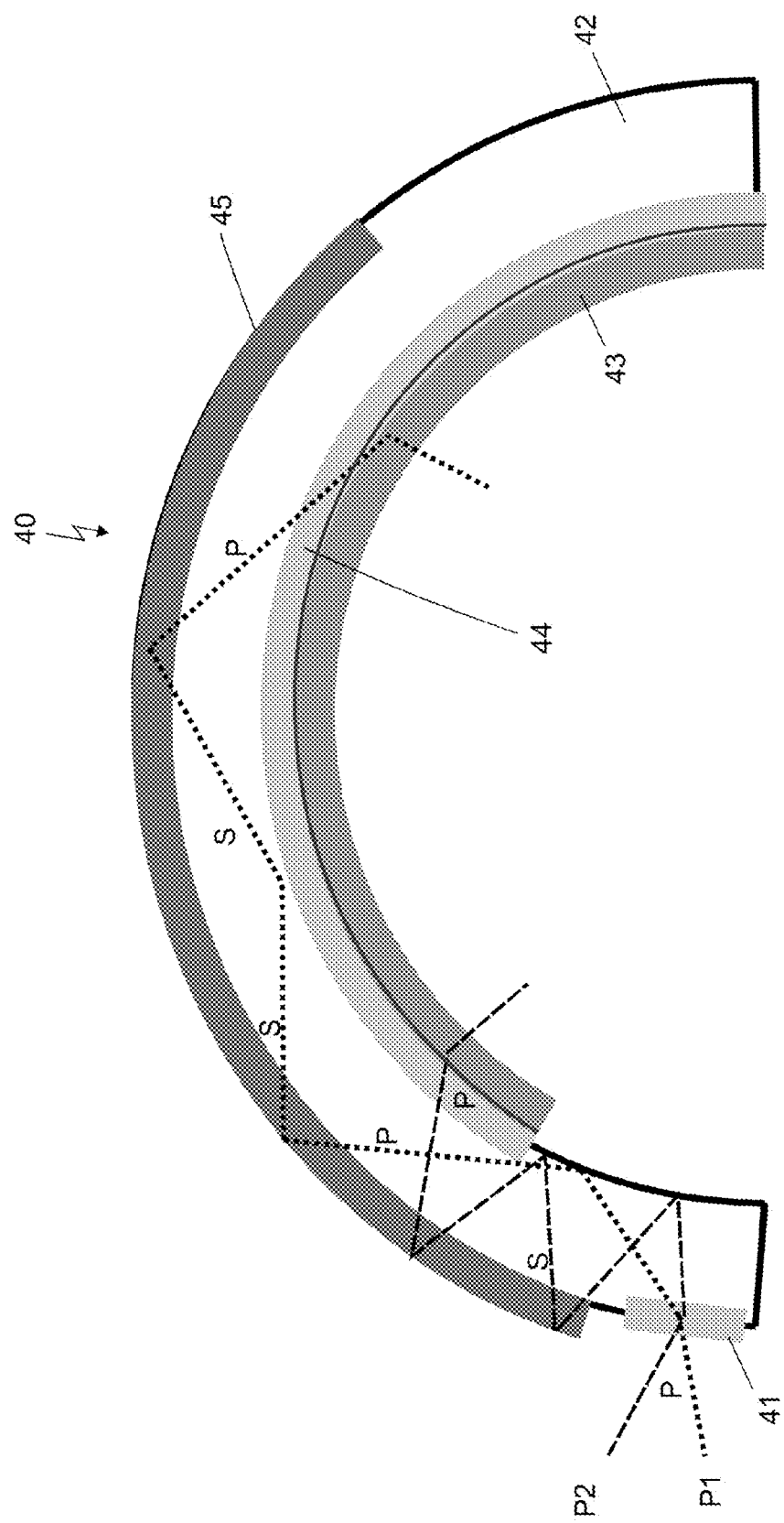
FIG. 2: shows a schematic illustration of a light guiding device according to the invention.

This option of the polarization setting or polarization change of the light to avoid an undesired coupling of light out of the light guide is schematically illustrated in FIG. 2. The display device of FIG. 1a now comprises a differently formed light guiding device 40, where only the light guiding device 40 is shown and explained in FIG. 2 for the sake of simplicity. This light guiding device 40 comprises a light coupling device 41, a light guide 42, and a light decoupling device 43. The light coupling device 41 comprises a grating element in this exemplary embodiment for coupling the light into the light guide 42. The grating element is provided here on a surface of the light guide 42 facing toward the SLM (not shown). A curved light guide 42 is also used in this exemplary embodiment. The light decoupling device 43 also has a grating element for coupling the light out of the light guide 42 here. Moreover, a reflective polarization element 44 is provided. This reflective polarization element 44 can preferably be designed as a wire grid polarizer. In order that the reflective polarization element can act accordingly in this arrangement, it is arranged between the light guide 42 and the light decoupling device 43. However, it is also possible that the reflective polarization element is integrated into the light decoupling device. The reflective polarization element is formed in this case so that incident light in one polarization state is reflected thereby and light in another polarization state is led through or transmitted thereby. For example, S-polarized light is reflected and P-polarized light is transmitted. Furthermore, a retardation layer 45 is provided, which is applied to an outer side of the light guide 42. The retardation layer 45 is applied here to a surface or boundary surface of the light guide 42 opposite to the light decoupling device 43.

The procedure during the coupling out of the light propagating in the light guide 42 of the light guiding device 40 is carried out here as follows. Two propagating light beams are shown in FIG. 2, which originate from two pixels of the SLM and are P-polarized (polarized parallel to the plane of incidence) before coupling into the light guide 42. The two linearly polarized light beams, shown by dashed and dotted lines here, are focused via the optical system (not shown) onto the light coupling device 41, so that an image of the light source is generated in the focal plane. The light beams of both pixels are incident at different angles on the light coupling device 41. These light beams are then coupled by means of the light coupling device 41 into the light guide 42, whereupon they propagate at different angles in the light guide 42, and experience a first reflection at a boundary surface of the light guide 42 in a region of the light guide 42 which is not provided with the light decoupling device 43. Both light beams are then incident on the retardation layer 45 at the opposing boundary surface of the light guide 42, pass through it for the first time, where the polarizations thereof are each rotated by 90°. This means that after passing through the retardation layer 45, both light beams are no longer P-polarized but rather are S-polarized (polarized perpendicularly to the plane of incidence). If the light is then incident on the reflective polarization element 44 at the boundary surface of the light guide 42, which is also provided with the light decoupling device 43, this light or this light beam, as shown by the dotted light beam, is reflected by the reflective polarization element 44. This light beam is then incident again on the retardation layer 45, where the polarization of the light beam is rotated again during the passage through the retardation layer 45, so that the light beam is now again P-polarized. After the passage of the retardation layer 45, the P-polarized light beam is incident again on the reflective polarization element 44, can pass it or is let through thereby, and is then incident on the light decoupling device 43, in the form of a grating element here. The light decoupling device 43 then deflects this light beam accordingly and couples it out of the light guide 42. The light beam shown by a dashed line is also transmitted by the reflective polarization element 44 after passing through the retardation layer 45 twice and is deflected by the light decoupling device 43 and coupled out of the light guide 42. This also takes place as with the light beam shown by a dotted line after a reflection of the light beam twice at the boundary surfaces of the light guide 42, where the light beam shown by a dashed line is already coupled out of the light guide 42 in the first third thereof, since this light beam is incident at a different angle on the light coupling device 41 than the light beam shown by a dotted line. The number of the reflections of the light in the light guide 42 can be determined and defined before or also during the operation of the display device.

Because the light only reaches the light decoupling device 43 after an even number of reflections at the boundary surfaces of the light guide 42, a better separation of the light which is to be coupled out of the light which is not to be coupled out can thus be performed. Therefore, in the exemplary embodiment shown in FIGS. 1a, b, in combination with the polarization rotation of the light, it is possible to prevent the light from already being coupled out of the light guide after three reflections. The desired and predetermined or predefined decoupling can accordingly be achieved and take place after four reflections.

This embodiment can also be combined with the angle selectivity of a decoupling grating element. There is a small region in FIGS. 1a, 1b, in which the light beams are also incident after two and four reflections at the boundary surfaces of the light guide 5 on the same position or on the same point of the grating element of the light decoupling device 7 and would therefore have the same polarization. This small region is located in the first half of the extension of the light guide 5. In the case of a separation of these light beams only by polarization, this small region could not be used in the generation of a segment of the field of view. The angles of incidence of the light beams on the grating element of the light decoupling device 7 at the same position in the case of two and in the case of four reflections differ however significantly more strongly than the angles of incidence of the light beams in the case of three and in the case of four reflections of the light beams in the light guide 7. In this case, the angle selectivity of a grating element can thus be used to prevent a light beam from already being inadvertently coupled out after two reflections.

Figure 3:
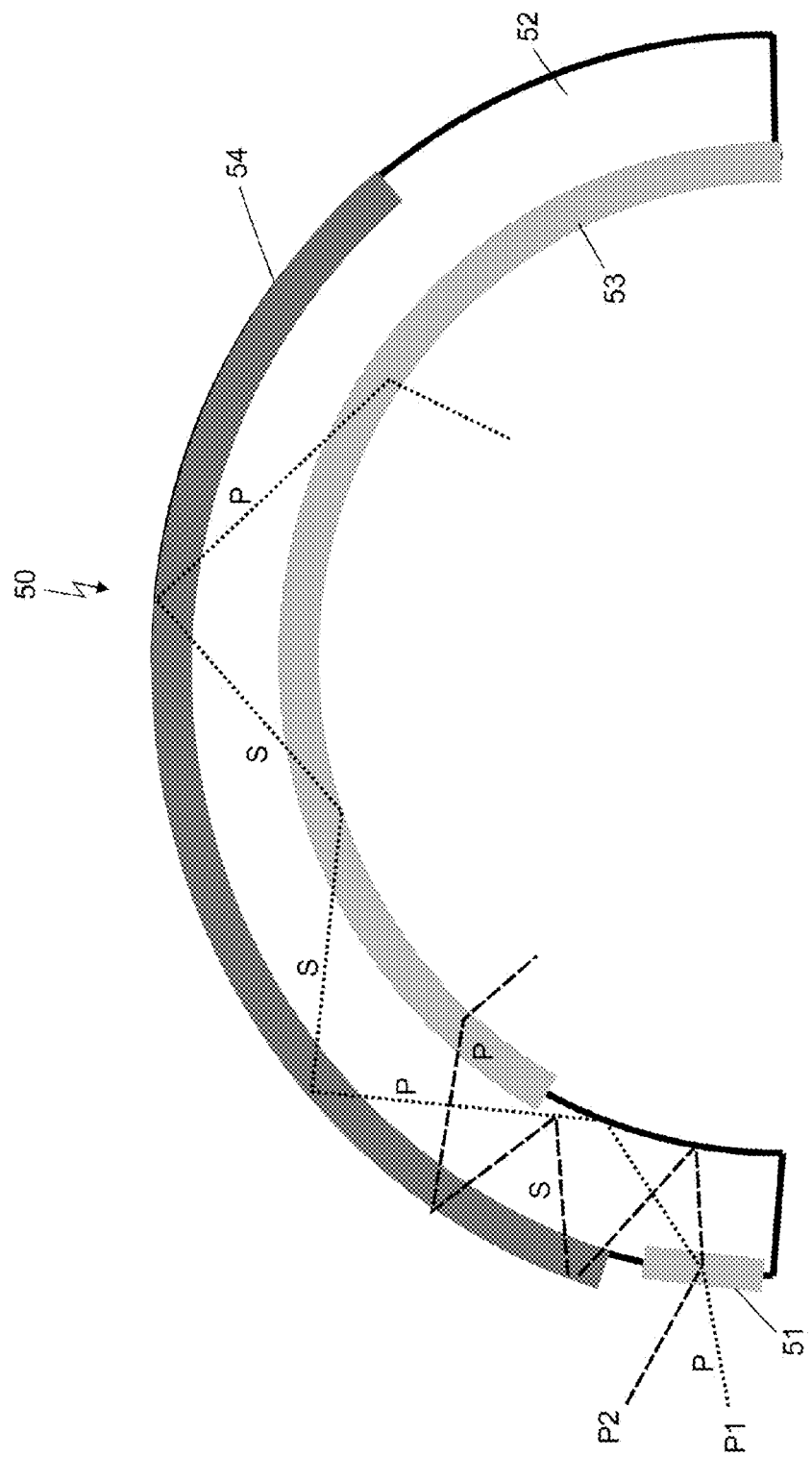
FIG. 3: shows a schematic illustration of an alternatively embodied light guiding device.

A further light guiding device 50 is illustrated in FIG. 3, which can also be used in the display device according to FIGS. 1a and 1b. This light guiding device 50 comprises a light coupling device 51, a light guide 52, and a light decoupling device 53. The light coupling device 51 also has a grating element here as in FIG. 2 for coupling the light into the light guide 52. The grating element is also provided here on a surface of the light guide 52 facing toward the SLM (not shown). The light guide 52 is also formed curved here. The light decoupling device 53 now has a polarization-selective grating element here for coupling the light out of the light guide 42. The polarization-selective grating element is designed in this case so that incident light in one polarization state is reflected thereby and light in another polarization state is let through or transmitted thereby. Furthermore, the light guide 52 also comprises a retardation layer 54 on an outer side, which is applied here to a surface or boundary surface of the light guide 52 opposite to the light decoupling device 53.

The procedure during the coupling out of the light propagating in the light guide 52 of the light guiding device 50 is carried out as follows here. The two propagating light beams shown by dashed and dotted lines are also again shown in FIG. 3 as in FIG. 2 here, which originate from two pixels of the SLM and are P-polarized before coupling into the light guide 52. The two linearly polarized light beams are focused via the optical system (not shown) on the light coupling device 51, so that an image of the light source of the illumination device is generated in the focal plane. These light beams are then coupled at different angles by means of the light coupling device 51 into the light guide 52 and experience a first reflection at a boundary surface of the light guide 52 in a region of the light guide 42 which is not provided with the light decoupling device 53. The two light beams are then incident on the retardation layer 54 at the opposing boundary surface of the light guide 52, and pass through it for the first time, where the polarizations thereof are each rotated by 90°. This means that after the passage of the retardation layer 54, both light beams are no longer P-polarized, but rather S-polarized. If the light beam shown by a dotted line is then incident on the polarization-selective grating element of the light decoupling device 53, this light beam is reflected by the polarization-selective grating element. This light beam is then again incident on the retardation layer 54, where during the passage of the retardation layer 54, the polarization of the light beam is rotated again, so that the light beam is now again P-polarized. After the further passage of the retardation layer 54, the P-polarized light beam is again incident on the polarization-selective grating element, passes it or is let through thereby, is deflected accordingly, and is coupled out of the light guide 52. The light beam shown by a dashed line is also transmitted by the polarization-selective grating element of the light decoupling device 53 after passing the retardation layer 54 twice, is deflected accordingly, and is coupled out of the light guide 52. This also takes place as with the light beam shown by a dotted line after a reflection of the light beam twice at the boundary surfaces of the light guide 52, where the light beam shown by a dashed line is already coupled out therefrom in the first third of the light guide 52, however, since this light beam is incident at a different angle on the light coupling device 51 than the light beam shown by a dotted line.

A better separation of the light beams after an even number of reflections at the boundary surfaces of the light guide 52 can also take place here.

In other words, after an odd number of reflections at the boundary surface of the light guide 52, which is provided with the retardation layer 54, the light incident on the polarization-selective grating element of the light decoupling device 53 is not deflected by this polarization-selective grating element and thus reflected at the boundary surface between the light guide 52 and the surroundings. After an even number of reflections at the boundary surface of the light guide 52, which is provided with the retardation layer 54, the light incident on the polarization-selective grating element of the light decoupling device 53 is deflected by this polarization-selective grating element and is coupled out of the light guide 52, where the even and the odd numbers of reflections can be exchanged. The number of the reflections of the light in the light guide 42 can be determined and defined before or also during the operation of the display device.

If the light guiding devices 40 and 50 according to FIGS. 2 and 3 are used individually in a display device according to FIG. 1a, a large field of view, which is generated stereoscopically, can then be generated using each of these light guiding devices 40 and 50. This large field of view is generated by the coupled out light beams, which originate from the edge pixels of the SLM, and the propagation paths of different lengths thereof in the light guiding device and by a distance of the light guiding device from a provided observer position. This would mean, for example, if the light beam shown by a dashed line and the light beam shown by a dotted line each were to originate from an edge pixel of the SLM, the coupled out light beams shown by dashed and dotted lines would then generate a field of view, where these light beams would laterally delimit this field of view. This field of view forms a segment which was stereoscopically generated in this manner by means of the light guiding device 40 or 50. An item of information of a scene or an object encoded or displayed in the SLM can then be represented within this field of view.

The use of a retardation layer is not to be restricted to the use of S-polarized or P-polarized light, however. The retardation layer can, for example, instead also rotate +45° linearly polarized light into −45° linearly polarized light or change left-circular polarized light into right-circular polarized light.

If, for example, the polarization-selective grating element in FIG. 3, which selectively only deflects P-polarized light, is replaced by a Bragg polarization grating element, which selectively deflects only right-circular polarized light, the retardation layer is then also to be formed in such a way that it changes right-circular light to left-circular light and vice versa, where, for example, already circularly polarized light from both pixels of the SLM is to be coupled into the light guiding device.

Figure 4:
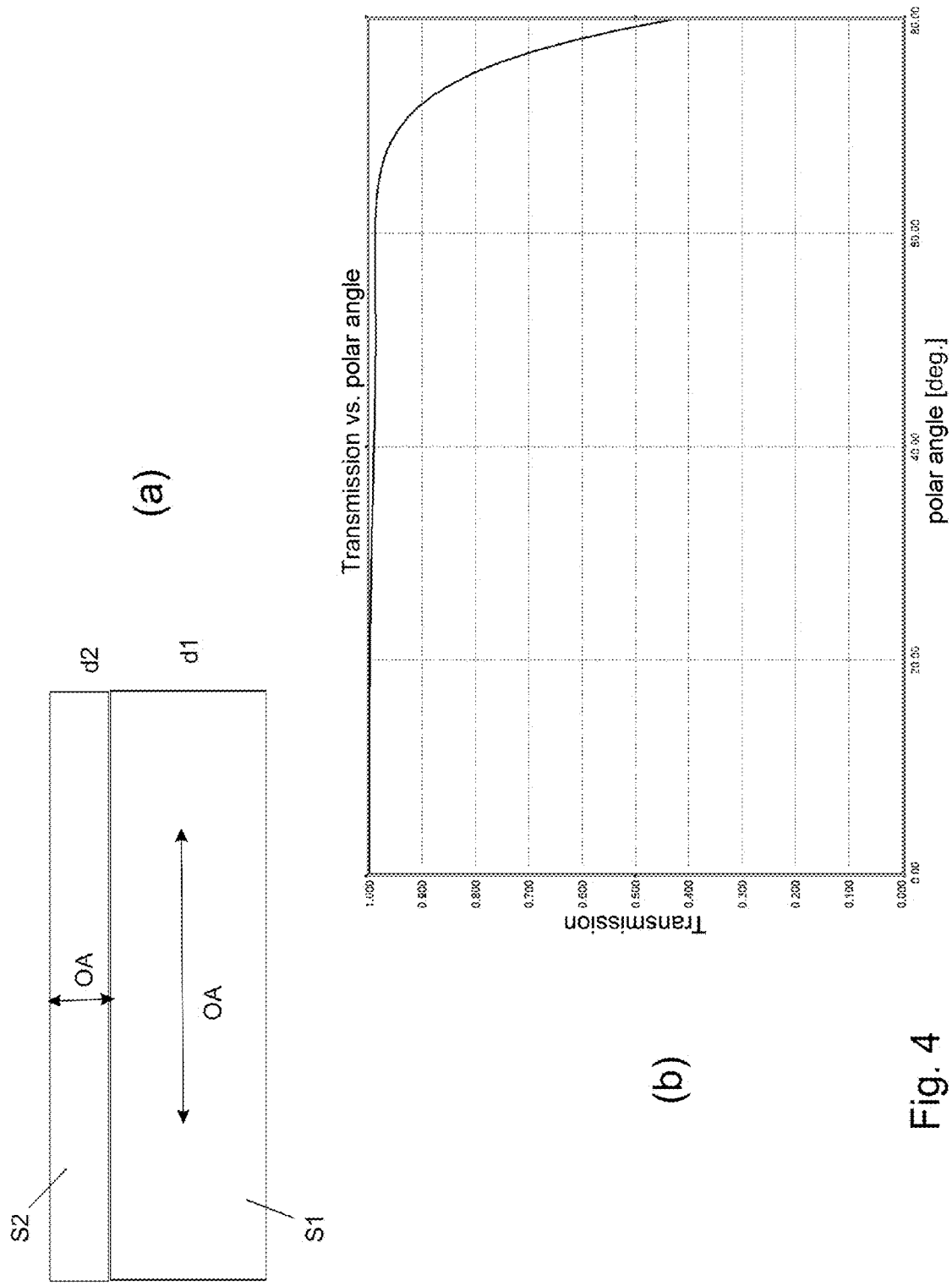
FIGS. 4a, b: show a schematic illustration of two retardation layers in conjunction with a graphic representation of layer thickness data of the retardation layers, where the retardation layers can be provided in a light guiding device.

In FIG. 4(a), two retardation layers are shown as they can be provided in a comparable manner, for example, in the light guiding device 40 or 50 of FIGS. 2 and 3. In this case, the arrangement of two retardation layers changes +45° linearly polarized light into −45° linearly polarized light, however.

In the disclosed exemplary embodiment according to FIGS. 1a and 1b, in which the coupling of an angular spectrum of the light of approximately 30° in air and approximately 20° in the material of the light guide, which has an index of refraction of n=1.5, at least one retardation layer is to be designed in such a way that it generates the desired and required polarization rotation or polarization change of the light in the light guide with a high efficiency for this entire angular spectrum of the light. A thickness of the at least one retardation layer is accordingly to be optimized for an inclined light incidence, since the light beams are incident at an angle on the at least one retardation layer. In addition, the retardation which the light beams experience during the passage of the at least one retardation layer is to be similar for all light beams within a predetermined angular range. For example, if an angular spectrum of 20° is coupled into the material of the light guide using a light coupling device, which comprises a mirror element, the angular spectrum which propagates after the light coupling in the light guide is thus also 20°. If, for example, the mirror element is tilted in relation to the average coupled-in light beam, i.e., the light beam from the average pixel of the SLM, by 27.5°, this light beam thus propagates at the double angle, i.e., 55°, in the light guide. The propagation angles for light beams of other pixels of the SLM are then between 45° and 65°. For this angular range of 45° and 65°, therefore in this example the retardation which the light beams experience during the passage of the at least one retardation layer is to be similar for all light beams.

These two retardation layers S1 and S2 each consist of a birefringent material, where in general the birefringent material of the two retardation layers S1 and S2 can be identical or different. In the example described here, the material is identical. The two retardation layers S1 and S2 are arranged one over another in this case. As can be seen in FIG. 4(a), the retardation layer S1 has a greater thickness d than the retardation layer S2. In the retardation layer S1, the optical axis OA of the birefringent material is oriented in the plane of this layer S1. In the retardation layer S2, the optical axis OA of the birefringent material is oriented perpendicularly to this layer.

FIG. 4(b) shows a graphic representation of simulation data with respect to the retardation layers illustrated in FIG. 4(a). The illustrated curve shows that with a suitable selection of the layer thickness and the birefringence and the alignment of the optical axis of the two retardation layers S1 and S2 for angles of incidence of the light in a range between 0° up to slightly above 65°, for in each case significantly more than 95% of green light of the wavelength λ=532 nm, the polarization is rotated or changed in the desired and required manner.

Due to the selection of the optical axes of the retardation layer S1 and the retardation layer S2, the retardation of the retardation layer S1 decreases with increasing propagation angle, but the retardation of the retardation layer S2 increases with increasing propagation angle. The angle dependence is largely compensated for by the combination of both retardation layers S1 and S2.

In FIGS. 4a and 4b, the birefringence and the thickness of the retardation layer S1 are selected so that they correspond to a quarter-wave plate in the case of perpendicular incidence, therefore d×Δn=133 nm. The retardation layer S2 has a thickness of d×Δn=50 nm.

For a material having a birefringence of Δn=0.1, the total thickness of the two retardation layers S1 and S2 is therefore 1.83 μm.

The arrangement described here of two retardation layers represents only one example of how, by using more than one retardation layer and setting the parameters such as thickness and birefringence of the respective retardation layer and alignment of the optical axis of the respective retardation layer, the rotation of the polarization can be achieved for a propagation angular range. The use according to the invention of at least one retardation layer for the rotation of the polarization in a light guide is expressly not to be restricted to this special arrangement of two retardation layers.

As already mentioned, multiple stereoscopic and/or holographic segments can be generated by means of the display device to generate a large field of view. A controllable polarization switch can be provided for a further enlargement of the field of view by the provision of multiple adjacent segments, in which the light is coupled out of the light guiding device after a different number of reflections. The controllable polarization switch can be arranged in the display device in the light path before the coupling of the light into the light guiding device. If, for example, in comparison to the exemplary embodiments shown in FIGS. 2 and 3, the polarization of the light is rotated by 90° before the coupling into the light guiding device, i.e., S-polarized light instead of P-polarized light is coupled into the light guide of the light guiding device, upon the first incidence on the reflective polarization element or on the polarization-selective grating element of the light decoupling device, the light would thus already be transmitted thereby and could be coupled out. Such an embodiment of the display device having a controllable polarization switch in the light direction before the light guiding device can preferably be used in the generation of multiple holographic segments or also in the generation of multiple holographic segments in combination with the generation of a single stereoscopic segment, which is provided in this embodiment for generating a background of a focused three-dimensional object in a scene. For a solely stereoscopic representation of an object or a scene in a field of view, a large field of view may generally already be achieved using a single segment, which then forms the entire field of view.

If the outgoing light beams of the three illustrated pixels of the SLM are compared to one another in FIG. 1a, it can thus be seen that these light beams have the same difference in the coupling angles thereof in the light coupling device, for example, a difference of approximately 10° each in the angle in the material or approximately 15° in air and viewed from a pixel in the middle region of the SLM and from two edge pixels of the SLM. However, it can be seen clearly that in the decoupled angular spectrum of the light in relation to the observer region, the angle of the light beam of the first pixel to the light beam of the second pixel is significantly less than the angle of the light beam of the second pixel to the light beam of the third pixel. The number of the pixels of the SLM per degree of viewing angle which is visible to an observer of a scene would therefore not be equal over the entire field of view. Instead, a gradient would result in the number of the pixels per degree of viewing angle in the field of view. If the observer is located in an observer plane and observes the represented scene in the field of view, i.e., the observer looks in the direction of the light guiding device, through the observer region according to FIG. 1a, the pixels would thus be grouped together more densely on a left side viewed from the observer than on a right side viewed from the observer, so that the scene is represented distorted or warped and is therefore reproduced incorrectly.

This difference in the density of the pixels per degree of viewing angle can be compensated for in the image contents represented in the field of view. This is performed, for example, in that the represented scenes or objects are scaled or distorted accordingly. This can be performed during the encoding of the information in the SLM. However, the one boundary region of the field of view could then have a pixel density which can limit the visible resolution of the scene or the object. For a combination of the view of a stereoscopic segment with at least one holographic segment which can have a high number of three-dimensional object points per degree of viewing angle and can be tracked to the viewing direction of the eye of an observer, this lower resolution in an edge region of the field of view does not represent a problem, however, since the stereoscopically represented contents of the scene are only active in a region of the retina of the eye of the observer which detects the incident light only at coarse resolution in any case.

For a display device which is only to displace stereoscopic contents of a scene or object in a large segment, an intermediate imaging of the SLM can also be carried out, in which the pixels of the SLM are enlarged differently. This means that on the light coupling side of the light guiding device or the light guide, the number of pixels per degree of coupling angle has a gradient which is oriented opposite to the gradient of the number of pixels per degree of decoupling angle on the light decoupling side of the light guiding device or the light guide. The different angle distances of the light beams to one another upon the coupling out therefrom of the light guiding device is equalized by the scaling or pre-distortion of the pixel images or the scenes or objects to be represented, so that a constant number of pixels per degree of viewing angle again results or is provided over the entire field of view.

Figure 5B:
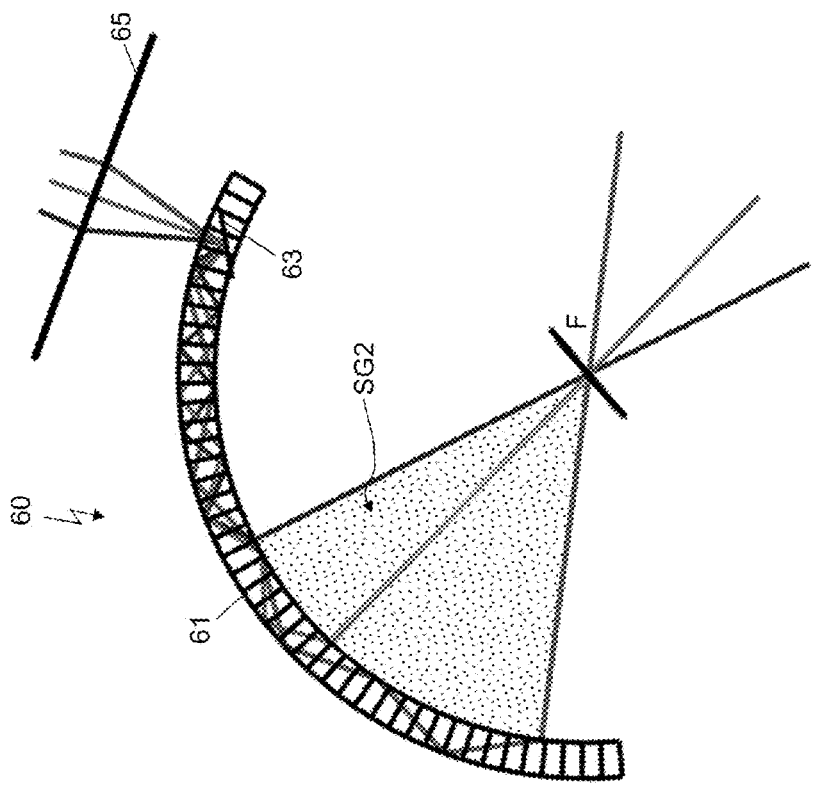
FIGS. 5a, b, c: show a schematic illustration of a light guiding device, using which two segments can be generated for a field of view.
Figure 5A:
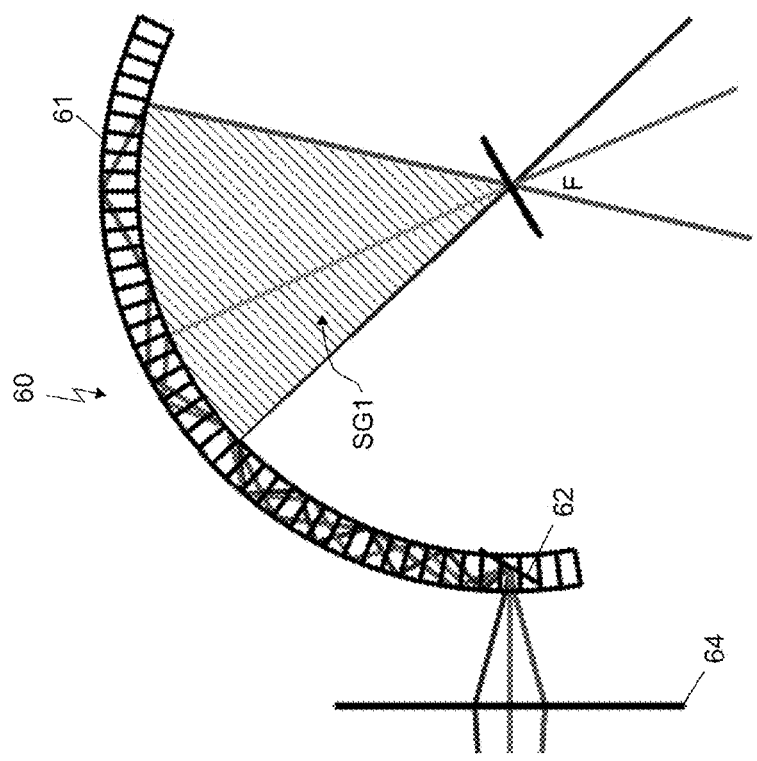
Figure 5C:
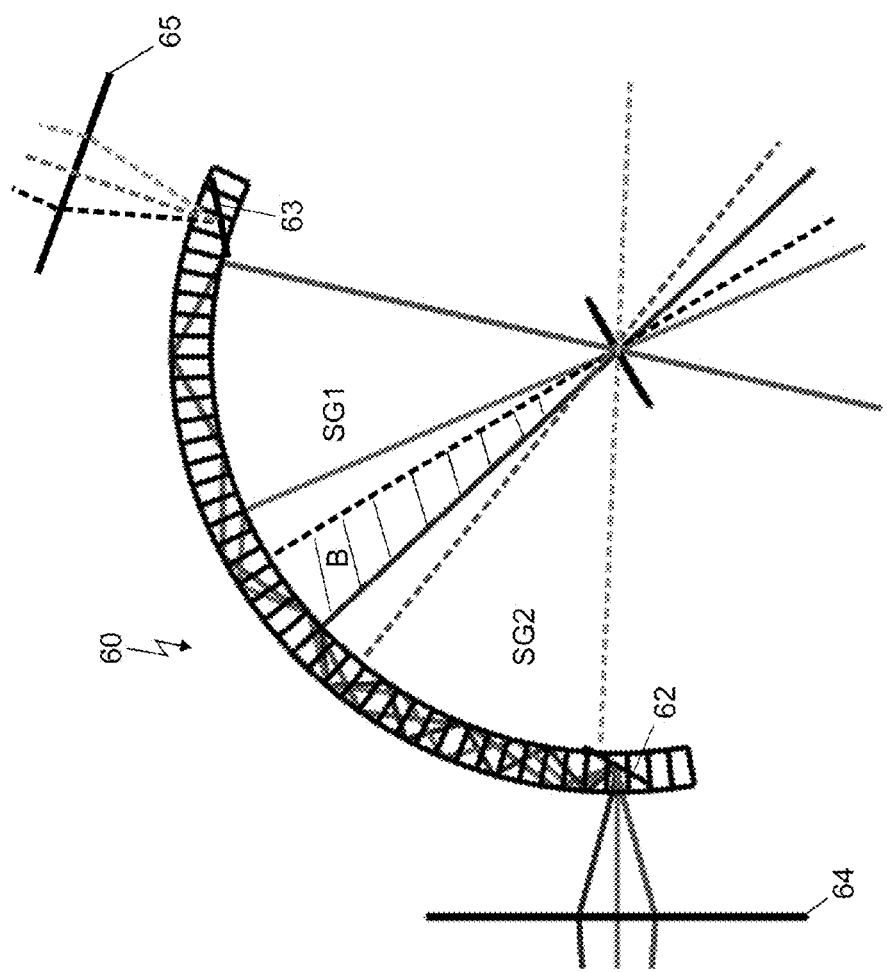

FIGS. 5a, 5b, and 5c each schematically show only a part of a display device, which primarily comprises an imaging element of the optical system and the light guiding device, where the generation of one segment is shown in FIG. 5a, the generation of another or further segment is shown in FIG. 5b, and these two segments are shown together in FIG. 5c. Such a display device can preferably be designed as a VR (virtual reality) display. In this display device, at least two segments are generated, where two stereoscopic segments are generated here. As is apparent from FIGS. 5a, 5b, 5c, the coupling of the light takes place from two essentially opposing sides into the light guiding device. The display device only comprises one light guiding device 60 having a light guide 61 here. However, two light coupling devices 62 and 63 are provided here in the light guiding device 60. These light coupling devices 62 and 63 are formed essentially identically having mirror elements and only have different positions in the light guide 61. In FIG. 5a, the coupling of the light is performed using the light coupling device 62 into the light guide 61 to generate a first segment viewed from the left side of the figure. In FIG. 5b, the coupling of the light is performed using the light coupling device 63 into the light guide 61 to generate a second segment viewed from the top right of the figure. The light guiding devices 62 and 63 each comprise a mirror element here for coupling the light into the light guide 61, which also delimit the entire field of view. Only the active light decoupling device is shown in each case in both FIGS. 5a and 5b, i.e., in FIG. 5a, the light decoupling device 62 is in operation and in FIG. 5b, the light decoupling device 63 is in operation. The first segment SG1 of FIG. 5a, which is generated using an imaging element 64 of the optical system and the light guiding device 60, and which is shown shaded here, has a horizontal field of view of approximately 60° and a pixel density, i.e., the pixels per degree of viewing angle, which decreases toward the top right viewed from the left side of FIG. 5a. The second segment SG2, which is generated using an imaging element 65 of the same optical system and the same light guide 61 of the light guiding device 60, and which is shown dotted here, also has a horizontal field of view of approximately 60° and then a pixel density which decreases toward the bottom left viewed from the right side of FIG. 5b. Considered overall, the pixel density is highest in a middle region of the entire field of view for the entire field of view, which is composed of both segments SG1 and SG2. Both segments SG1 and SG2 together form a large field of view, where these two segments SG1 and SG2 can be overlapped or overlaid in a small region B, as can be seen in FIG. 5c. The pixel density can be additionally increased in this overlap region B by this overlap of the two segments SG1 and SG2. FIG. 5c schematically shows both segments SG1 and SG2 in this case. The field of view of segment SG1 is shown by solid lines, where the field of view of segment SG2 is shown by dashed lines. The overlap region B of both segments SG1 and SG2 is shown shaded. In this exemplary embodiment of FIGS. 5a, 5b, and 5c, the individual segments SG1 and SG2 each have a field of view of approximately 60°. The entire field of view is therefore approximately 100° with an overlap region B of approximately 20°.

The human eye has a significantly lower resolution in the peripheral field of view than in the central field of view in the normal case. The position of the central field of view can be rotated by rotating the eye. However, rotations typically only take place in the range of approximately ±15°. The head would rather be co-rotated in the event of greater changes of the viewing direction by the observer. It is therefore an enormous advantage if independently of the present viewing direction of the observer, a higher pixel density per degree of viewing angle is present in the central region of the field of view, for example in a central region of approximately 30°, than in the edge regions of the field of view.

The display device, in particular the light guiding device of the display device, using which at least two segments can be generated, is therefore to be provided and arranged in front of the eye of an observer in such a way that the overlap region of the two generated segments of the field of view, which has the highest pixel density per degree of viewing angle, corresponds to the central viewing direction of the observer, where the pixel density per degree of viewing angle decreases from the overlap region toward both sides of the field of view with increasing viewing angle.

To decouple the light for the generation of the first segment SG1 and the second segment SG2, the light decoupling device (not shown here) can comprise at least two different angle-selective deflection grating elements such as, for example, volume gratings. Since the light beams propagating in the light guide 61 are each incident at a large angle from opposing sides on the angle-selective deflection gratings because of the two light coupling devices 62 and 63 provided at a distance to one another, for example, at angles of +45° to +65° from the one light coupling device and at angles of −45° to −65° from the other light coupling device, a separation of the decoupling of the individual light beams can be carried out reasonably because of the angle selectivity of the deflection grating elements.

The coupling of the light from two different sides and/or at a distance to one another at two different coupling positions to generate the two segments SG1 and SG2 can be performed using two different SLMs in combination with an optical system in each case. However, it is also possible to transmit time-sequentially the light which is modulated by an SLM with the corresponding information required for the representation of a scene to the light coupling device 62 and to the light coupling device 63 or vice versa via a deflection device. The resolution of a represented scene in a stereoscopically generated field of view and/or within a stereoscopic segment forming the field of view can be selected as less than the number of pixels per degree of viewing angle, of course. This moreover means that such a display device according to FIG. 5*a* can also comprise, for example, a gaze tracking and tracking device (gaze tracking unit), in particular to adapt the high-resolution image content or the represented high-resolution scene or object to the viewing direction of the observer. This is summarized under the term "foveated rendering".

Exemplary embodiments are described in the following FIGS. 6, 7, and 8, which are based on a combination of two light decoupling devices in a light guiding device for coupling light out of the light guiding device. These light guiding devices can be used in a display device, which generates both stereoscopic segments and also holographic segments or which generates an image of an SLM or an image of an order of diffraction in a Fourier plane of the SLM.

Figure 6:
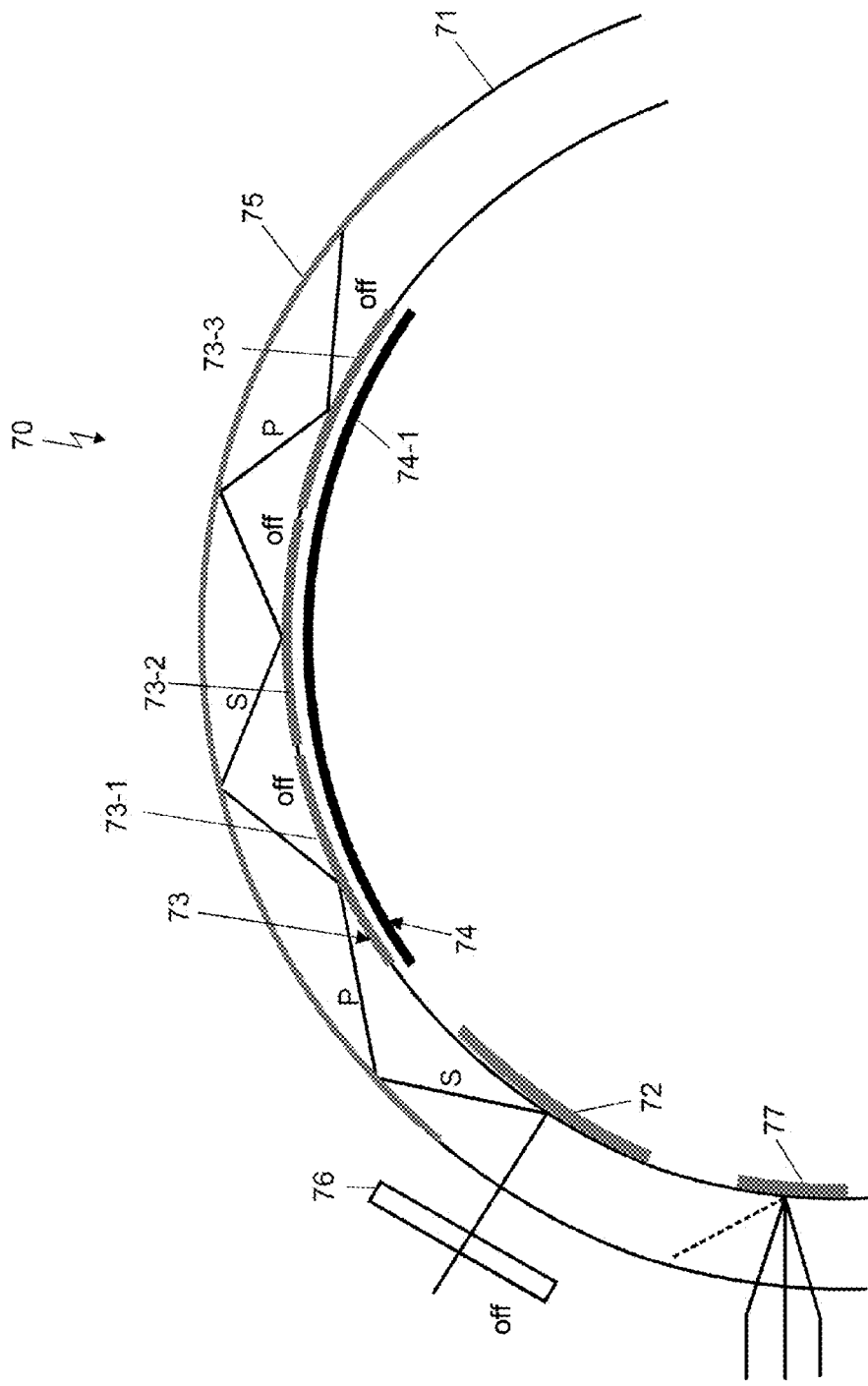
FIG. 6: shows a schematic illustration of a light guiding device which comprises two light decoupling devices, in conjunction with a polarization switch, where a light decoupling device is in a first driving state.
Figure 7:
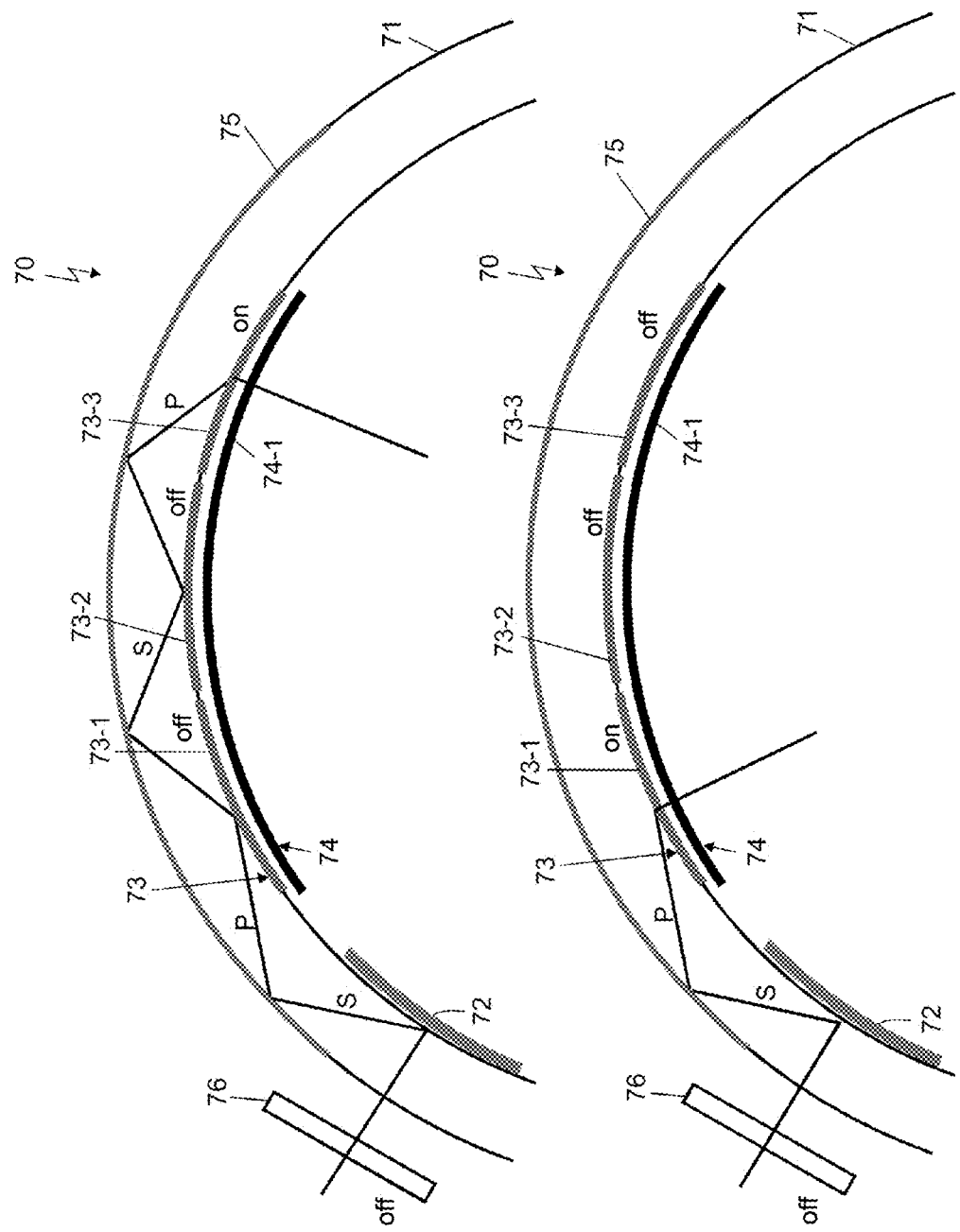
FIG. 7: shows a schematic illustration of the light guiding device according to FIG. 6, where a light decoupling device is in a second driving state.
Figure 8:
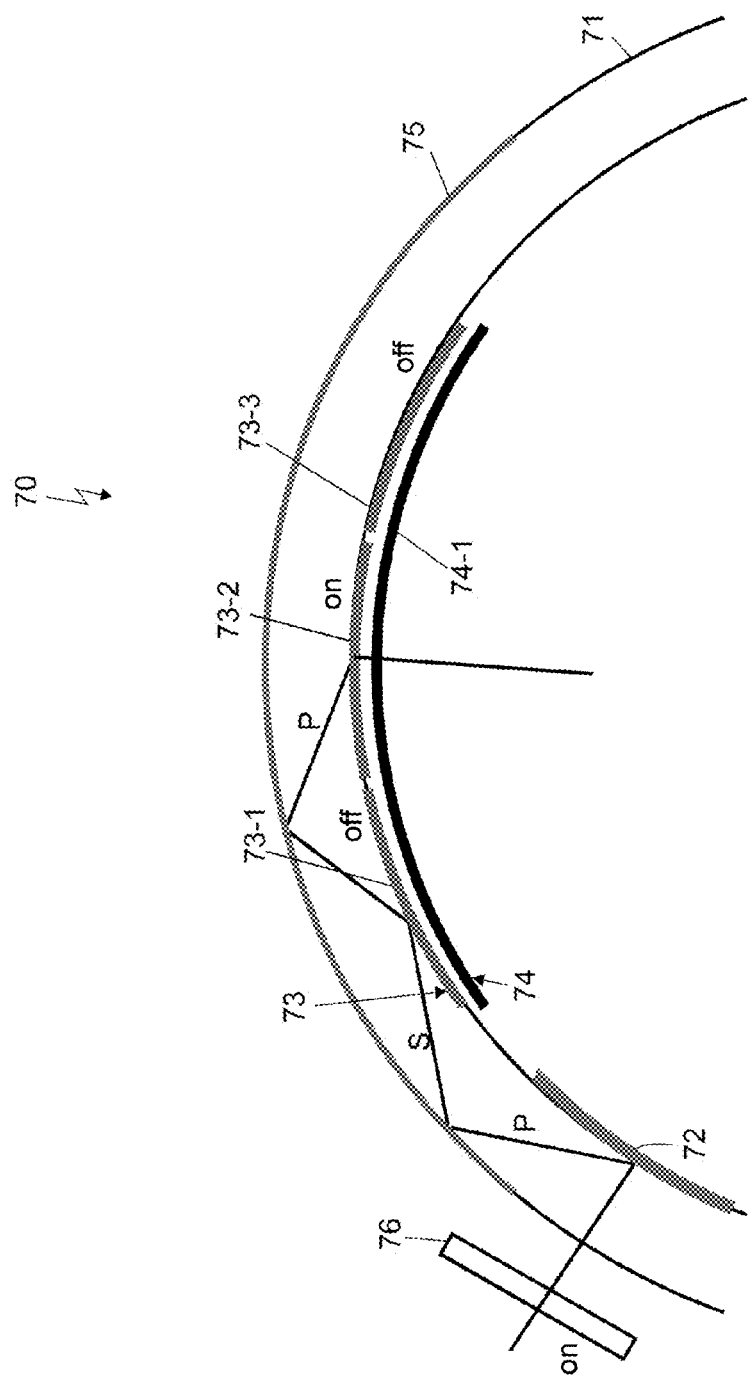
FIG. 8: shows a schematic illustration of the light guiding device according to FIG. 6 and FIG. 7, where a light decoupling device is in a third driving state.

The generation of at least one holographic and one stereoscopic segment are described in greater detail in FIGS. 6, 7, and 8. For example, a holographic segment can also be generated using single parallax encoding, so that a sweet spot is provided in one direction and a virtual observer window is provided in the other direction. The holographic segment would then in this example have a small field of view horizontally, in the encoding direction, but a large field of view vertically, thus perpendicularly to the paper plane.

For this purpose, both light decoupling devices of the light guiding device can each comprise at least one switchable or controllable grating element. The controllable grating elements can be switched into a first switching state and into a second switching state and can be controlled accordingly so that in the first switching state, which is the active switching state ("ON") of the grating element, the light incident on the grating element is coupled out of the light guide. In the second switching state, which is the passive switching state ("OFF") of the grating element, the light incident on the grating element is not coupled out of the light guide, but rather propagates further in the light guide.

Moreover, the controllable grating elements can be divided into sections, which can accordingly be switched separately into the first switching state ("ON") or into the second switching state ("OFF"). For a display device, in which a single stereoscopic segment is to be combined with at least one holographic segment, in particular the at least one controllable grating element of the light decoupling device for coupling out light for generating the at least one holographic segment is divided into sections.

The decoupling of a holographic and additionally a stereoscopic segment to achieve a large field of view takes place time-sequentially. This means that in chronological succession, the at least one controllable grating element or a section of the at least one controllable grating element of a first light decoupling device and thereafter the at least one controllable grating element or a section of the at least one controllable grating element of a second light decoupling device are switched into the first switching state "ON" and at the same time in each case the at least one controllable grating element or a section of the at least one controllable grating element of the other light decoupling device is switched into the second switching state "OFF". The decoupling of multiple holographic segments and possibly also of multiple stereoscopic segments can also be performed time-sequentially in the same manner in this case. For this purpose, for example, only specific sections of the at least one grating element of the respective light decoupling device can be switched into the first switching state "ON", so that the light incident on these sections of the at least one grating element is coupled out and various segments are generated.

A light guiding device which comprises two light decoupling devices each having at least one controllable grating element is complex and costly to manufacture, however, where the light decoupling is also more demanding in operation of such a light guiding device. This fact applies in particular if a curved light guide is used in the light guiding device and therefore the controllable grating elements of the light decoupling devices each also have to have a curvature.

Therefore, a light guiding device which also comprises two light decoupling devices is preferred, where, however, these light decoupling devices are formed in such a way that one light decoupling device of the two light decoupling devices only comprises at least one passive grating element and the other of the two light decoupling devices comprises at least one controllable grating element. It is particularly preferred in this case that the other light decoupling device only comprises precisely one controllable grating element. The controllable grating element can in turn be divided into sections, however.

Such a light guiding device for a display device, for example for a display device according to FIG. 1*a*, is illustrated in FIG. 6. The light guiding device 70 shown comprises a light guide 71, which is also formed curved in this exemplary embodiment, where a flat or plane light guide can also be used here as in all other light guiding devices disclosed in this document. Moreover, the light guiding device 70 comprises a light coupling device 72 and two light decoupling devices 73 and 74. The light guide 71 is moreover provided on its outer side with a retardation layer 75. During each passage of the light, i.e., during a first passage of the retardation layer 75 and a second passage of the retardation layer 75 after a reflection on the boundary surface of the light guide 71 facing toward it, the polarization of the light is changed. The polarization of the linearly polarized light is rotated by means of the retardation layer 75 by 90° here. A single retardation layer is schematically shown here. In general, however, according to FIG. 4, it can also be an arrangement having multiple retardation layers.

Using the light guiding device according to FIG. 6, a stereoscopic segment having a large field of view and additionally a holographic segment which is smaller in its dimensions are generated and represented. The position of the smaller holographic segment is displaceable within this large field of view generated using the stereoscopic segment. To achieve a displacement of the holographic segment, the holographic segment is alternatively coupled out after a different number of reflections of the light guiding device 70.

The light decoupling device 74, which couples out the large stereoscopic segment, comprises a grating element 74-1. However, the light decoupling device 74 can also comprise multiple grating elements. The grating element 74-1 is formed transmissive and passive here. The light decoupling device 74 can preferably comprise at least one polarization-selective grating element here, for example a polarization-selective volume grating. The at least one grating element is preferably only to couple out P-polarized light of the light guide 71 of the light guiding device 70. The polarization-selective grating element 74-1 of the light decoupling device 74 provided according to FIG. 6 is to deflect incident linearly P-polarized light in this case. Incident linearly S-polarized light is not to be deflected and coupled out, however.

A Bragg polarization grating element can also be used as a grating element, which has the property of only deflecting right-circular polarized light, but not left-circular polarized light. The principle of the light coupling out of the light guiding device 70 described hereafter is thus also applicable to a light guiding device which comprises a Bragg polarization grating element. In a configuration of the light guiding device having a Bragg polarization grating element, the retardation layer 75 would then be formed so that it converts or changes right-circular polarized light into left-circular polarized light and vice versa.

The light decoupling device 73 for the at least one holographic segment, in contrast, comprises a controllable or switchable grating element. In addition, the light decoupling device 73 can comprise further passive grating elements, for example, grating elements for correction for individual wavelengths.

Grating elements generally have a dependence of the angle of deflection thereof on the wavelength. The same grating element would typically deflect red light at a greater angle than green or blue light. For a display device having a light guiding device, light of different wavelengths, for example, red, green, and blue light (RGB) is advantageously also to be coupled out at the same position or point of the light guide after an equal predefined number of reflections of the light within the light guide. In addition, the light of different wavelengths is then also to propagate from the decoupling position of the light guide at the same angle to an observer region. This may be implemented most easily if the coupling angle and decoupling angle of the light are equal for the wavelengths used (red, green, blue (RGB)).

A use of grating elements for coupling or decoupling of light into/out of the light guiding device and an implementation of equal angles for various colors or wavelengths requires either the use of different grating elements for the individual wavelengths or a single grating element, the grating period of which is settable for the individual colors. Volume gratings are known for the fact, for example, that they can have a restricted angle selectivity and wavelength selectivity. It is possible, for example, to generate volume gratings which advantageously essentially deflect either only red light or only green light or only blue light, since they have a very low diffraction efficiency at the respective other wavelengths.

The light coupling device or also the light decoupling device can comprise a stack made of three grating elements, for example one volume grating for red light, one volume grating for green light, and one volume grating for blue light. These three volume gratings are designed so that they each also deflect red, green, and blue light, which is incident at the same angle on the volume grating, at the same angle. It is also known that it is possible with volume gratings to expose multiple grating functions in a single layer. Instead of a grating element stack, the light coupling device or also the light decoupling device could therefore also comprise a single grating element having multiple exposed grating functions for the deflection of red, green, and blue light. In the case of a grating element stack, all grating elements can optionally be designed as switchable and/or controllable. However, multiple passive grating elements are then preferably used in combination with a single switch element, for example a polarization switch.

Another possibility to achieve the same angle of deflection in the coupling and decoupling of the light for various wavelengths is the use of a grating element which deflects multiple wavelengths at different angles, in combination with corrective grating elements, which each correct the angle of deflection for a single wavelength so that this angle of deflection corresponds to the angle of deflection for another wavelength. In such a light coupling device or light decoupling device, for example, a first grating element for deflecting multiple wavelengths can be designed as a surface relief grating or as a polarization grating, while further grating elements for correcting the angle of deflection of one wavelength each can be designed as volume gratings. The first grating element deflects, for example, red, green, and blue light, where the green light is deflected at the desired angle, but the red light is deflected at an excessively large angle and the blue light is deflected at an excessively small angle. The further provided grating elements then carry out a correction of the angle of deflection for blue and red light so that red, green, and blue light are coupled at the same angle of deflection into the light guide and also coupled out again. For the correction of the angle of deflection for each wavelength, more than one grating element can also be used per wavelength, for example, an arrangement of volume gratings having two grating elements in each case per wavelength. A first volume grating for correcting the angle of deflection can carry out a pre-deflection in each case. A second volume grating can then deflect the pre-deflected light in such a way that the desired exit angle is implemented or results. The fact is utilized in this case that volume gratings having large angles of deflection generally have a narrower wavelength selectivity than volume gratings having small angles of deflection. It is easier to achieve the volume gratings only deflecting light of one wavelength by way of a narrower wavelength selectivity.

The controllable grating element is divided according to FIG. 6 into three sections, which are identified by 73-1, 73-2, and 73-3.

The light coupling device 72 for the generation and representation of the at least one holographic segment and only the light propagation in the light guide 71 for this holographic segment are shown in FIG. 6. In addition, the light coupling device 77 for the generation and representation of the at least one stereoscopic segment is shown. The light propagation in the light guide 71 for the stereoscopic segment is not shown for reasons of clarity. This light propagation and light decoupling for the stereoscopic segment would take place here in a similar manner as shown in FIG. 3, however.

A polarization switch 76 is arranged in the light propagation direction before the light guiding device 70 and thus before the coupling of the light into the light guide 71 for the generation of the holographic segment. The light coupling device 72 for the generation of the holographic segment is formed here so that it is not polarization-selective. This means that the light coupling device 72 has a similar efficiency for S-polarized light and for P-polarized light. The light coupling device 72 can comprise at least one grating element, which is formed, for example, as a volume grating. The volume grating can be constructed from photopolymer.

Volume gratings are known to have an angle selectivity and a wavelength selectivity. Volume gratings can therefore advantageously be used to intentionally deflect light of specific angles of incidence and/or specific wavelengths with a high efficiency.

In a display device having a light guiding device, for example for the generation of a holographic segment in conjunction with the generation of a virtual observer window, through which an observer can observe the generated scene, or for the generation of a stereoscopic segment in conjunction with the generation of a sweet spot, in general a specific width of the angle selectivity is necessary to generate an observer region, i.e., a virtual observer window or a sweet spot, in the light propagation direction after the light guiding device. It is then necessary for the light to be coupled out from the same position of the light guide at different angles to propagate from the light guide to various positions within the observer region.

The grating elements used in the light decoupling device are therefore to be formed in such a way, for example by selection of the thickness and refractive index modulation thereof, that the angle selectivity thereof is sufficiently wide to generate a sweet spot. However, on the other hand, this could make the use of different grating elements at the same position in the light guide more difficult, using which a separation of the incident light beams is to be performed on the basis of the angle selectivity of the individual grating elements.

According to the stereoscopic segment described in FIGS. 1a, b, the deflection angle of the grating element of the light decoupling device changes with the position of the grating element in the light guide for a curved light guide.

In the generation of a holographic segment, the deflection angle of the grating element of the light decoupling device is equal over the entire field of view for a curved light guide.

The case is described in FIG. 6 that the deflection angles of the grating element of the light decoupling device 73 do differ for the holographic element and the stereoscopic segment in the middle section 73-2, but such a small difference exists that it would not be possible to separate the deflection angles solely by way of the angle selectivity of a volume grating used as a grating element. In contrast thereto, the deflection angles of the grating element of the light decoupling device 73 for the holographic segment and for the stereoscopic segment are to differ more strongly in the sections 73-1 and 73-3, so that it is possible in these sections 73-1 and 73-3 to perform a separation of the decoupling of the holographic segment from the stereoscopic segment by way of the angle selectivity of the controllable grating element 73-1 or 73-3, respectively, which is set to the decoupling of the holographic segment, in comparison to the angle selectivity of the grating element 74-1 differing therefrom, which is set to the decoupling of a stereoscopic element. For example, the controllable grating element 73-1 is set so that it only deflects light having angles of incidence between 53° and 57°. The light of the stereoscopic segment only has light having angles between 45° and 50° at the position of the controllable grating element 73-1, however. The angle selectivity of the controllable grating element 73-1 is therefore sufficient to prevent light of the stereoscopic segment from being coupled out inadvertently.

FIG. 6 shows the following procedure for generating a holographic segment, where the polarization switch 76 and the light decoupling device 73 are controlled accordingly for the generation of the holographic segment. According to FIG. 6, the polarization switch 76 is in an off state or is switched off. The three sections 73-1, 73-2, and 73-3 of the light decoupling device 73 for the generation of the holographic segment are also in an off state. The S-polarized light, which is emitted by an illumination device (not shown) and is modulated with the required information by an SLM (also not shown), passes through the polarization switch 76 without changing its polarization and is incident on the light guiding device 70. The S-polarized light is coupled into the light guide 71 by means of the light coupling device 72. The S-polarized light is then incident on the retardation layer 75, whereby the polarization of the S-polarized light is changed, so that thereafter P-polarized light is provided. This P-polarized light is then incident on the first section 73-1 of the grating element of the light decoupling device 73 and is not coupled out thereby, but rather is deflected in the direction of the retardation layer 75. The P-polarized light is incident there on the retardation layer 75, and passes through it, where the P-polarized light is now converted back into S-polarized light. This S-polarized light is incident on the second section 73-2 and is also not coupled out by this section, but rather deflected again in the direction of the retardation layer 75. The S-polarized light is again incident on the retardation layer 75, and passes through it again, where the S-polarized light is converted back into P-polarized light. The P-polarized light is now incident on the third section 73-3 and is also not coupled out thereby and propagates further in the light guide 71. Since the grating element of the light decoupling device 73 is in an off state in all three sections, no light is coupled out thereby.

In the first and third sections 73-1 and 73-3 of the grating element of the light decoupling device 73, however, the angle of incidence of the light is outside the angle selectivity of this grating element, so that no light is coupled out. In the second section 73-2 of the grating element, S-polarized light is incident on the grating element, which would only selectively couple out and deflect P-polarized light, however. Therefore, decoupling of the light also does not occur.

In this driving state of the three sections 73-1, 73-2, and 73-3 of the grating element of the light decoupling device 73, i.e., if the grating element for generating the holographic segment is switched off or is in an OFF state in all three sections 73-1, 73-2, and 73-3, light for generating a stereoscopic segment could therefore be coupled out by means of the passive grating element of the light decoupling device 74. A further light coupling device 77 is provided for generating a stereoscopic segment, which is provided adjacent to the light coupling device 72 in the light guiding device 70 in FIG. 6. In this case, a polarization switch is not located before the light coupling device 77 in the light propagation direction. The light which is emitted by the illumination device and modulated with the required information by the SLM is directed onto the light coupling device 77 of the light guiding device 70 and coupled by means of this light coupling device 77 into the light guide 71 to generate the stereoscopic segment to achieve a large field of view. This is illustrated by the indicated light beam. The beam course in the light guide 71 for the generation of the stereoscopic segment would then be as shown, for example, in FIGS. 2 and 3. The individual light beams originating from the pixels of the SLM and propagating in the light guide 71 are then incident on the passive grating element 74-1 of the light decoupling device 74, are coupled out by this grating element 74-1 of the light guide 71, and generate a stereoscopic segment, which forms a large field of view.

The light guiding device 70 according to FIG. 6 is illustrated in two different cases in FIG. 7. The polarization switch 76 is in an off state in both cases, where either the first section 73-1, according to the case shown at the bottom, or the third section 73-3, according to the case shown at the top, of the grating element of the light decoupling device 73 is switched on or is in an ON state for generating a holographic segment. The grating element of the light decoupling device 73 only couples out P-polarized light, where S-polarized light propagates further in the light guide 71. This means that if P-polarized light is incident on the grating element of the light decoupling device 73, the light is then coupled out in each case either in the first section 73-1 or in the third section 73-3, since these sections 73-1 and 73-3 are in an ON state according to the two cases of FIG. 7. To couple out the light by means of the first section 73-1 of the grating element, in principle the switching state of the second section 73-2 and the third section 73-3 is unimportant, since the light which is coupled out by means of the first section 73-1 does not reach the second section 73-2 and the third section 73-3 at all. Vice versa, however, the first section 73-1 has to be in an OFF state if the light is to be coupled out by means of the third section 73-3.

The light guiding device 70 according to FIGS. 6 and 7 is also illustrated in FIG. 8. FIG. 8, however, shows the case in which the polarization switch 76 is in an ON state. In this manner, the polarization switch 76 changes the polarization of the incident light. In the case according to FIG. 8, this means that the S-polarized light incident on the polarization switch 76 is converted into P-polarized light. P-polarized light is thus now coupled into the light guide 71 of the light guiding device 70 by means of the light coupling device 72. The P-polarized light is then incident on the retardation layer 75, is converted into S-polarized light, and is incident on the first section 73-1 of the grating element of the light decoupling device 73. The S-polarized light is not coupled out, but rather propagates further in the light guide 71, is converted by means of the retardation layer 75 back into P-polarized light and is incident on the second section 73-2 of the grating element, which is in an ON state. The P-polarized light incident on this second section 73-2 is now coupled out by means of this section 73-2 of the light guide 71. The two other sections 73-1 and 73-3 are each in an OFF state. The switching states of the two sections 73-1 and 73-3 are not important here, however, since S-polarized light is incident on each of these sections 73-1 and 73-3 and S-polarized light is not coupled out by the grating element of the light decoupling device 73.

Using the described arrangement of the two light decoupling devices 73 and 74 in the light guiding device 70 according to FIGS. 6 to 8, a stereoscopic segment can thus be coupled out by means of the light decoupling device 74 and additionally one or also multiple holographic segments can alternatively be coupled out in various sections of the grating element of the light decoupling device 73 time-sequentially from the same light guide 71 of the light guiding device 70.

Such an arrangement of the two light decoupling devices 73 and 74 can also be combined with further preferred passive grating elements, for example for the correction of the decoupling angles of the light for various wavelengths.

Figure 9:
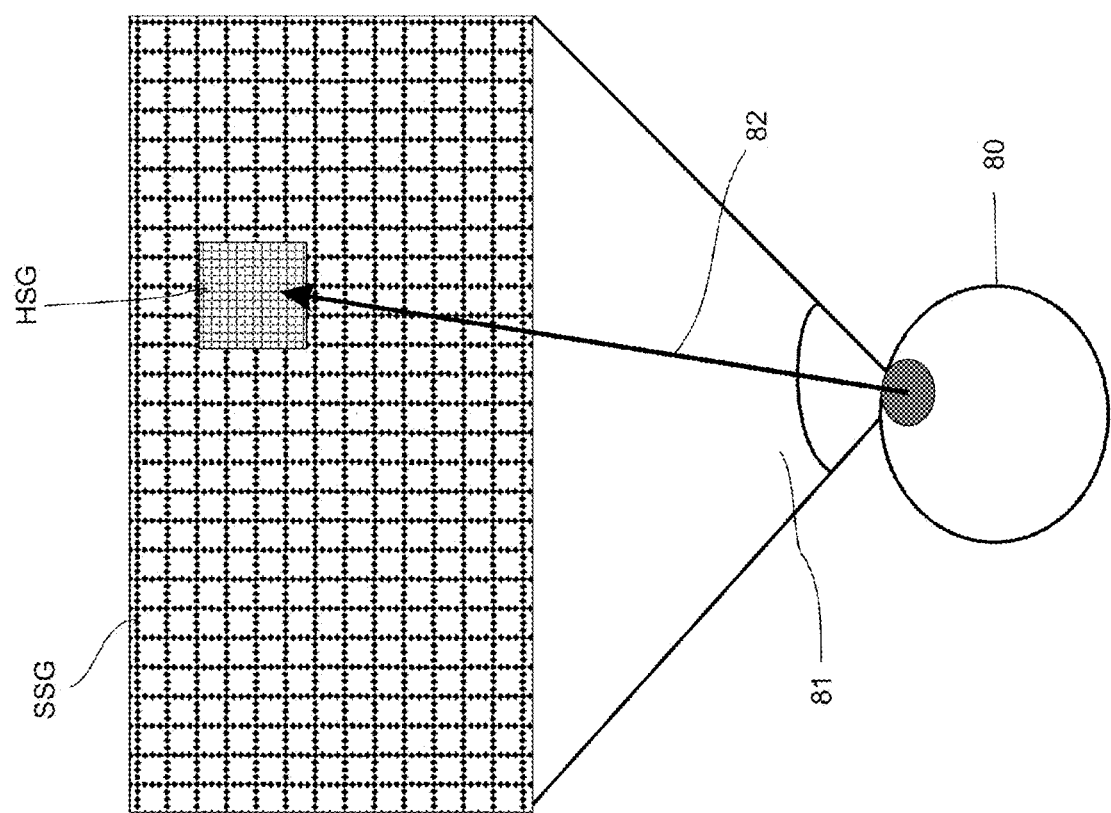
FIG. 9: shows a schematic illustration of a field of view for a holographic segment and for a stereoscopic segment.

The field of view for a holographic segment HSG and a stereoscopic segment SSG is illustrated schematically seen from an observer eye 80 in a slightly perspective illustration in FIG. 9. The stereoscopic segment SSG generates a fixed field of view 81 and generates an image of the SLM having a low pixel density. This is schematically shown in FIG. 9 by the rough shading or structure. The holographic segment HSG generates a small field of view, which is located within the field of view of the stereoscopic segment SSG and can be displaced so that this holographically generated field of view or segment HSG corresponds to a viewing direction 82 of the eye 80 of the observer. The holographic segment HSG generates an image of the SLM having a higher pixel density. This is schematically shown in FIG. 9 by a fine shading or structure. The viewing direction 82 of the observer is detected by means of a gaze tracking device, which is not shown in FIG. 9, however.

Figure 10:
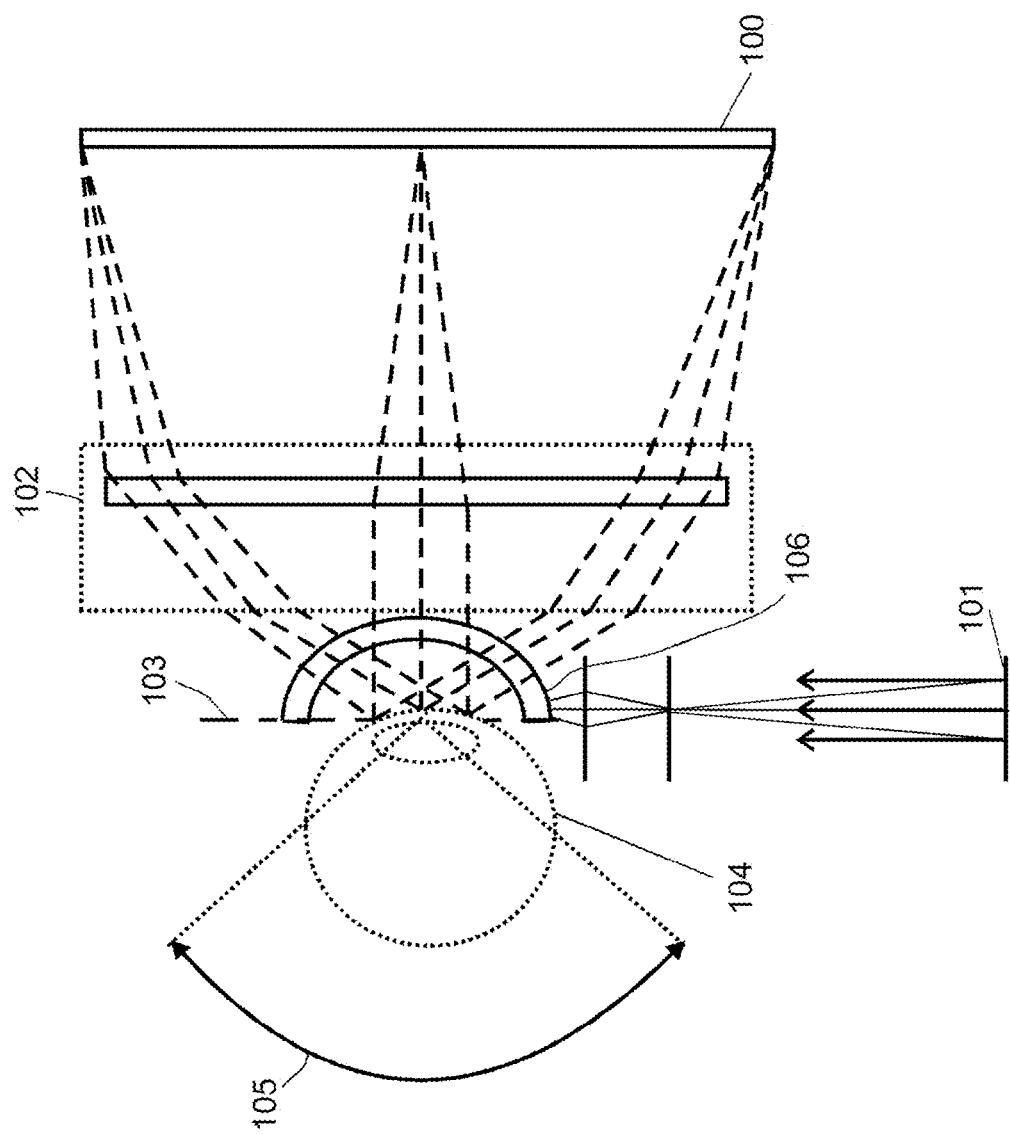
FIG. 10: shows a schematic illustration of a head-mounted display according to the invention.

In all illustrated exemplary embodiments according to FIGS. 1a, b to FIG. 9, and also FIG. 10, which is described hereafter, at least one image of the SLM is generated by means of the optical system and the light guiding device, which is embodied as a stereoscopic segment or as a holographic segment and which defines the field of view within which the scene or object to be represented is to be displayed. If the field of view is formed by means of a stereoscopic segment and at least one holographic segment, the part of the scene which is not directly focused on or looked at by an observer, but rather represents the background for the object looked at, can then be represented in the stereoscopically generated segment. It is therefore sufficient if this stereoscopically generated part of the scene is represented having a lower resolution and only two-dimensionally (2D). The part of the scene which the observer looks at directly, for example, an object, however, is represented by means of the holographically generated segment. This holographic segment is represented at a high resolution, where the focused object of the scene is generated holographically and three-dimensionally (3D). The focused three-dimensionally represented spatial region or the holographic segment can additionally be moved by adapting or tracking the decoupling position for the light for generating the holographic segment to a detected viewing direction of an observer using the light guiding device.

Furthermore, it is also to be noted that in other embodiments of the invention, the grating elements of both light decoupling devices of a light guiding device for generating a stereoscopic segment and additionally at least one holographic segment can also be formed as reflective and can be arranged on the outer side of the light guide, where in this case the retardation layer is to be arranged on the inner side of the light guide. If volume gratings are used as grating elements, thus, for example, the differing angle selectivity of reflective and transmissive volume gratings in the individual embodiments can each be utilized. Reflective volume gratings typically have a somewhat wider angle selectivity. Transmissive volume gratings can have a very narrow angle selectivity.

In the general case, the light guiding device can also comprise a separate light coupling device for the stereoscopic segment and for the holographic segment, or also multiple light coupling devices for different holographic and stereoscopic segments, the latter as shown in FIG. 6. In contrast to the light decoupling device, the light coupling devices can advantageously be arranged spatially separated at various positions on the light guide.

Overall, the possibilities thus result in various embodiments of the light guiding device of using either one stereoscopic segment as such alone having a fixed depth of the image of the SLM or having a variable depth of the image of the SLM, where the latter can preferably be combined with the detection of the viewing direction of an observer (gaze tracking). The option furthermore exists of combining the stereoscopic segment having fixed depth or variable depth of the image of the SLM with at least one holographic segment, where the holographic segment is generated either with the aid of the same light guiding device or with the aid of a separate light guiding device. If the same light guiding device is used to generate the stereoscopic segment and the at least one holographic segment, the light guiding device can thus comprise, for example, different, adjacent regions for the coupling of the light into the light guide for generating the holographic and stereoscopic segments, and/or the light guiding device can comprise different grating elements for decoupling the holographic and stereoscopic segments.

The combination of a holographic representation and a two-dimensional or three-dimensional stereoscopic representation using two different SLMs can be carried out, for example, in a VR (virtual reality) system, such as a head-mounted display. For this purpose, a light guiding device, which preferably comprises a curved light guide and can be designed according to FIGS. 5, 6, and 8, is arranged near-to-eye of a user of the head-mounted display. The user looks through this light guiding device in this case at a conventional two-dimensional or three-dimensional stereoscopic head-mounted display, as is already known from the prior art. By means of the light guiding device, at least one holographic segment can be generated and overlaid depending on the detected viewing direction at selected and/or defined positions. The corresponding regions are blanked out in the stereo representation, for example by setting the corresponding pixels of a stereo display to the amplitude of 0 (zero) and thus switching them off. If holographic segments are not generated, the observer looks through the light guiding device a two-dimensional or three-dimensional stereoscopic representation in a large field view of.

Such a head-mounted display is schematically illustrated in FIG. 10. The head-mounted display comprises an SLM 100 for generating a stereoscopic segment and an SLM 101 for generating at least one holographic segment. An optical system 102 is provided and arranged in the head-mounted display so that the SLM 100 is represented enlarged. The light is directed in this case into a plane of an exit pupil 103, in which an eye 104 of a user of the head-mounted display is located. In this case, a large field of view 105 is generated, which is formed by means of a stereoscopically generated segment. Furthermore, the head-mounted display comprises a light guiding device 106, which can be designed according to FIGS. 5 and 6 to 8. This light guiding device 106 is provided between the eye 104 of the user and the optical system 102. Light, which is modulated with corresponding information by the SLM 101 and emits therefrom, is coupled laterally into the light guiding device 106. The SLM 101 is illuminated with sufficiently coherent light for generating the at least one holographic segment. A holographic segment, which shows a three-dimensional holographically generated representation and can possibly be tracked to the eye movement of the user, is then coupled out of the light guiding device 106. The user of the head-mounted display would then furthermore perceive stereoscopic contents or representations or scenes through this light guiding device 106. However, additionally selected holographic segments can be holographically coupled out of the light guiding device 106 and three-dimensional contents or scenes can be represented depending on the viewing direction of the eye of the user.

The head-mounted display in FIG. 10 is only schematically illustrated. In general, the optical set-up of a stereoscopic head-mounted display cannot be assumed unchanged to also generate holographic segments using it, but rather, for example, the distance of the optical set-up to the eye of the observer has to be adapted, so that the light guiding device for the holographic representation still fits between the eye of the user and the optical set-up of the stereoscopic head-mounted display. The combination is also not to be restricted to the embodiment shown of a stereoscopic head-mounted display.

Moreover, combinations of the embodiments and/or exemplary embodiments are possible. Finally, it is also to be very particularly noted that the above-described exemplary embodiments are used solely to describe the claimed teaching, but do not restrict this teaching to the exemplary embodiments.

The invention claimed is:

1. A display device for representing two-dimensional and/or three-dimensional objects or scenes, comprising
    at least one spatial light modulation device having pixels for modulating light,
    at least one optical system,
    at least one light guiding device,
    where the optical system is designed in such a way that light beams originating from the individual pixels of the spatial light modulation device are incident on the at least one light guiding device at different angles on average in relation to the surface of the at least one light guiding device and can be coupled therein, whereby a coupling angular spectrum is definable, where the light beams propagating in the at least one light guiding device can be coupled out of the at least one light guiding device at different angles on average in relation to an observer region, whereby a decoupling angular spectrum is definable, where the decoupling angular spectrum is enlarged in comparison to the coupling angular spectrum.

2. The display device as claimed in claim 1, wherein the at least one light guiding device comprises a light guide, at least one light coupling device, and at least one light decoupling device, where the light propagates within the light guide via a reflection at boundary surfaces of the light guide, and where the coupling of the light out of the light guide by means of the light decoupling device is provided after a defined number of reflections of the light at the boundary surfaces of the light guide.

3. The display device as claimed in claim 2, wherein a controllable element is provided for varying the defined number of reflections of the light at the boundary surfaces of the light guide.

4. The display device as claimed in claim 1, wherein if the light incident on the at least one light guiding device is formed as a light bundle or light field, which comprises multiple or a plurality of light beams, a coupling out of the light guide is provided for the light beams after a number of reflections at the boundary surfaces of the light guide of the light guiding device which is equal in each case for all light beams of the light bundle or light field.

5. The display device as claimed in claim 1, wherein in each case a light incidence position on one of the boundary surfaces of the light guide, which the light from this pixel reaches after a defined number of reflections, is determinable from geometrical properties and optical properties of the light guide and optical properties of the light coupling device for each pixel of the at least one spatial light modulation device.

6. The display device as claimed in claim 5, wherein a thickness and/or a possible curvature of the boundary surfaces of the light guide are usable as geometrical properties of the light guide to determine the light incidence position, where an index of refraction of the light guide material is usable as an optical property of the light guide.

7. The display device as claimed in claim 1, wherein an image of the at least one spatial light modulation device is provided by means of the at least one light guiding device and the at least one optical system.

8. The display device as claimed in claim 1, wherein a field of view, within which an item of information of a scene encoded in the at least one spatial light modulation device can be represented, is definable by propagation paths of different lengths of light from edge pixels of the at least one spatial light modulation device in the light guide and by a distance of the light guide to a provided observer position.

9. The display device as claimed in claim 1, wherein a light source image of at least one light source provided in an illumination device or an image of the spatial light modulation device is provided by means of the optical system in the light path before coupling of the light into the light guiding device.

10. The display device as claimed in claim 9, wherein the light coupling device is provided at or in a region of a position of a light source image.

11. The display device as claimed in claim 1, wherein the light coupling device comprises at least one mirror element or at least one grating element, which is designed as a passive or controllable grating element.

12. The display device as claimed in claim 11, wherein a grating constant of the grating element or an angle of inclination of the mirror element in relation to the surface of the light guide is usable as an optical property of the light coupling device for determining the light incidence position, which the light reaches after a defined number of reflections.

13. The display device as claimed in claim 1, wherein the at least one light decoupling device is provided in the at least one light guiding device in such a way that the extension and the position of the light decoupling device comprises all light incidence positions which the light from different pixels of the spatial light modulation device reaches after a defined number of reflections on one of the boundary surfaces of the light guide.

14. The display device as claimed in claim 13, wherein the light decoupling device comprises at least one grating element, in particular a deflection grating element, preferably an angle-selective deflection grating element, preferably a volume grating, or at least one mirror element.

15. The display device as claimed in claim 14, wherein the at least one grating element is designed as controllable, where the grating period of the grating element is variably controllable in dependence on the light incidence position, which the light in the light guide reaches after a defined number of reflections, or in dependence on the light incidence angle, which the light in the light guide has after a defined number of reflections.

16. The display device as claimed in claim 1, wherein the light guiding device comprises at least one retardation layer.

17. The display device as claimed in claim 1, wherein the light guiding device comprises at least two retardation layers, where the at least two retardation layers each comprise a birefringent material, where the birefringent material of the at least two retardation layers is identical or different.

18. The display device as claimed in claim 17, wherein the optical axis of the birefringent material of a first retardation layer is oriented in the plane of this layer, where the optical axis of the birefringent material of a second retardation layer is oriented perpendicularly to the plane of this layer.

19. The display device as claimed in claim 16, wherein at least one retardation layer is applied on an outer surface of the light guide, and in that the index of refraction of this retardation layer and the propagation angle of the light propagating in the light guide are selected in such a way that total reflection of the light occurs at the boundary surface of this retardation layer to the surroundings of the light guide.

20. The display device as claimed in claim 16, wherein the thickness of the at least one retardation layer and the birefringence and the alignment of the optical axis of the at least one retardation layer are each designed in such a way that upon incidence of linearly polarized light and for the average propagation angle of the light propagating in the light guide, after a first passage of the light through the at least one retardation layer, reflection is provided at the boundary surface to the surroundings of the light guide, and after a subsequent further passage of the light through the at least one retardation layer, the polarization state of the light is rotated by 90°, or that upon incidence of circularly polarized light and for the average propagation angle of the light propagating in the light guide, after a first passage of the light through the at least one retardation layer, reflection is provided at the boundary surface to the surroundings of the light guide, and after a subsequent further passage of the light through the at least one retardation layer, the polarization state of the light is circular in the opposite direction.

21. The display device as claimed in claim 16 the thickness of the at least one retardation layer and the birefringence and the alignment of the optical axis of the at least one retardation layer are each designed in such a way that upon incidence of linearly polarized light and for the entire propagation angular range of the light propagating in the light guide, after a first passage of the light through the at least one retardation layer, reflection at the boundary surface to the surroundings of the light guide is provided, and after a subsequent further passage of the light through the at least one retardation layer, the polarization state of the light is essentially rotated by 90°.

22. The display device as claimed in claim 16, wherein the polarization state of the light in the light guide is changeable or settable using the at least one retardation layer, in such a way that the polarization states of the light differ for an even number of reflections and for an odd number of reflections of the light in the light guide.

23. The display device as claimed in claim 1, wherein a reflective polarization element, preferably a wire grid polarizer, is provided, which is arranged between the light guide and the light decoupling device.

24. The display device as claimed in claim 23, wherein the orientation of the reflective polarization element is selectable in such a way that after an odd number of reflections at the boundary surface of the light guide, which is provided with the at least one retardation layer, the light incident on the reflective polarization element is reflected, where after an even number of reflections at the boundary surface of the light guide, which is provided with the at least one retardation layer, the light incident on the reflective polarization element is transmitted, where the even and the odd number of reflections can be exchanged.

25. The display device as claimed in claim 2, wherein the light decoupling device comprises a polarization-selective grating element.

26. The display device as claimed in claim 25, wherein after an odd number of reflections at the boundary surface of the light guide, which is provided with the at least one retardation layer, the light incident on the polarization-selective grating element of the light decoupling device is not deflected by this grating element and is reflected at the boundary surface between the light guide and the surroundings, where after an even number of reflections at the boundary surface of the light guide, which is provided with the at least one retardation layer, the light incident on the polarization-selective grating element of the light decoupling device is deflected by this grating element and exits from the light guide, where the even and the odd number of reflections can be exchanged.

27. The display device as claimed in claim 1, wherein a controllable polarization switch is provided, which is arranged before the at least one light guiding device in the light direction.

28. The display device as claimed in claim 1, wherein the at least one optical system and the at least one light guiding device are provided for generating a stereoscopic or at least one holographic segment forming the field of view of an image of the at least one spatial light modulation device, where a stereoscopic or holographic representation of a scene or an object is provided within the field of view.

29. The display device as claimed in claim 1, wherein the at least one optical system and the at least one light guiding device are provided for generating a stereoscopic and at least one holographic segment or for generating at least two holographic segments, where the stereoscopic segment and the at least one holographic segment or the at least two holographic segments each together form a field of view, within which a three-dimensional scene or a three-dimensional object can be represented.

30. The display device as claimed in claim 1, wherein the at least one light guiding device comprises two light coupling devices for generating at least two segments of a field of view.

31. The display device as claimed in claim 30, wherein the two light coupling devices are combined with the light guide at a distance from one another or directly adjacent to one another and light from the at least one illumination device can be coupled by means of the two light coupling devices at different positions into the light guide.

32. The display device as claimed in claim 30, wherein the at least two generated segments overlap and form the field of view, where an overlap region of the two segments has the highest pixel density per degree of viewing angle and corresponds to a central viewing direction of an observer observing a two-dimensional and/or three-dimensional scene.

33. The display device as claimed in claim 30, wherein one segment of the at least two segments is formed as a stereoscopic segment and another segment of the at least two segments is formed as a holographic segment, where the holographic segment can be generated in the central viewing direction of the observer.

34. The display device as claimed in claim 30, wherein the at least two segments are formed as holographic segments, where an overlap region of the at least two segments corresponds to a central viewing direction or a viewing direction detected by gaze tracking of an observer observing a two-dimensional and/or three-dimensional scene.

35. The display device as claimed in claim 1, wherein at least two light decoupling devices are provided, where a first light decoupling device is provided for decoupling light for generating at least one holographic segment and a second light decoupling device is provided for decoupling light for generating at least one stereoscopic segment.

36. The display device as claimed in claim 35, wherein the light decoupling devices are designed as controllable, where the light decoupling devices are each controllable in such a way that in one driving state of the light decoupling devices, light is coupled out after a defined number of reflections, and in another driving state of the light decoupling devices, the light propagates further in the light guide.

37. The display device as claimed in claim 2, wherein at least one light decoupling device is divided into sections, where the at least one light decoupling device is designed as controllable in sections, where the at least one light decoupling device is controllable in such a way that the number of reflections of the light at the boundary surfaces of the light guide is changeable by one driving state of one section of the at least one light decoupling device, which corresponds to the light incidence position which the light reaches after a number of reflections, and by another driving state of a further section of the at least one light decoupling device or by another driving state of one section of a further light decoupling device, which corresponds to the light incidence position which the light reaches after a further number of reflections.

38. The display device as claimed in claim 35, wherein one light decoupling device of the two light decoupling devices comprises at least one passive grating element and a further light decoupling device of the two light decoupling devices comprises at least one controllable grating element.

39. The display device as claimed in claim 1, wherein a tracking device is provided, which is arranged in the light direction before the at least one light guiding device.

40. The display device as claimed in claim 39, wherein the tracking device comprises at least one grating element or one variable lens element, where a lens function is written into the at least one grating element.

41. The display device as claimed in claim 39, wherein a gaze tracking device is provided, using which a view of an observer observing the object or the scene can be tracked and detected, where the location of an image of the at least one spatial light modulation device or the location of a segment is adaptable to a focus position of an eye of the observer detected by means of the gaze tracking device using the tracking device.

42. The display device as claimed in claim 1, wherein the light guide of the at least one light guiding device is formed curved in at least one direction at least in sections.

43. The display device as claimed in claim 1, wherein a virtual observer region is generatable in a plane of a light source image or in a plane of an image of the at least one spatial light modulation device.

44. The display device as claimed in claim 1, wherein for the image or for a single segment of the image of the at least one spatial light modulation device, the coupling out of light coming from various pixels of the at least one spatial light modulation device after entry into the at least one light guiding device is provided after a number of reflections at the boundary surfaces of the light guide equal in each case for all pixels.

45. The display device as claimed in claim 1, wherein for different segments of the image of the at least one spatial light modulation device, the number of the reflections of the light at the boundary surfaces of the light guide for generating one segment differs from the number of the reflections of the light at the boundary surfaces of the light guide for generating another segment.

46. A head-mounted display comprising two display devices, where the display devices are each designed according to a display device as claimed in claim 1 and are respectively associated with a left eye of an observer and a right eye of the observer.

47. A method for generating a large field of view, within which a scene or an object is represented stereoscopically and/or holographically, by means of at least one spatial light modulation device having pixels and at least one light guiding device, where
- the at least one spatial light modulation device modulates incident light with required information of the scene or of the object,
- the modulated light is formed by means of an optical system in such a way that light beams originating from the pixels of the at least one spatial light modulation device are incident at different angles on average in relation to the surface of the at least one light guiding device on the at least one light guiding device and are coupled therein, whereby a coupling angular spectrum is defined, where the light beams propagating in the at least one light guiding device are coupled out at different angles on average in relation to an observer region of the at least one light guiding device, whereby a decoupling angular spectrum is defined, where
- the decoupling angular spectrum is enlarged in comparison to the coupling angular spectrum.

48. The method as claimed in claim 47, wherein an image of the spatial light modulation device and/or an image of the spatial light modulation device composed of segments is generated.

49. The method as claimed in claim 47, wherein a light source image is generated in the region of the light coupling device.

* * * * *